(12) United States Patent
Suwabe et al.

(10) Patent No.: US 12,175,356 B2
(45) Date of Patent: Dec. 24, 2024

(54) ARITHMETIC DEVICE

(71) Applicant: Mitsubishi Electric Corporation, Tokyo (JP)

(72) Inventors: Kyohei Suwabe, Tokyo (JP); Kenya Sugihara, Tokyo (JP); Seidai Takeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1101 days.

(21) Appl. No.: 17/049,065

(22) PCT Filed: Jan. 28, 2019

(86) PCT No.: PCT/JP2019/002780
§ 371 (c)(1),
(2) Date: Oct. 20, 2020

(87) PCT Pub. No.: WO2019/220692
PCT Pub. Date: Nov. 21, 2019

(65) Prior Publication Data
US 2021/0241083 A1 Aug. 5, 2021

(30) Foreign Application Priority Data
May 15, 2018 (JP) .................................. 2018-093750

(51) Int. Cl.
*G06F 7/50* (2006.01)
*G06F 3/048* (2013.01)
(Continued)

(52) U.S. Cl.
CPC .............. *G06N 3/063* (2013.01); *G06F 7/50* (2013.01); *G06F 7/523* (2013.01); *G06F 7/5443* (2013.01); *G06N 3/048* (2023.01)

(58) Field of Classification Search
CPC ............ G06F 3/063; G06F 3/048; G06F 7/50; G06F 7/523; G06F 7/5443
See application file for complete search history.

(56) References Cited

U.S. PATENT DOCUMENTS

| 5,553,196 | A | 9/1996 | Takatori et al. |
| 11,042,370 | B2 * | 6/2021 | Maiyuran ................. G06T 1/20 |

(Continued)

FOREIGN PATENT DOCUMENTS

| CN | 207440765 U | * | 6/2018 | ........... G06F 30/327 |
| CN | 207517054 U | * | 6/2018 | ........... G06F 17/153 |

(Continued)

OTHER PUBLICATIONS

Yizhou Shan, "Near Memory Processing", published on Feb. 15, 2018 to http://lastweek.io/lego/paper/nmp/, retrieved May 3, 2024. (Year: 2018).*

Hyoukjun Kwon, etc., "Rethinking NoCs for Spatial Neural Network Accelerators", published via NOCS '17, Seoul, Republic of Korea, Oct. 19-20, 2017, retrieved Aug. 21, 2024. (Year: 2017).*

(Continued)

*Primary Examiner* — Shourjo Dasgupta
(74) *Attorney, Agent, or Firm* — Buchanan Ingersoll & Rooney PC

(57) ABSTRACT

An arithmetic device includes a first register that stores input data as values of a plurality of input neurons, a plurality of ports, and a plurality of processing element groups that correspond to the plurality of ports, respectively, and can access the first register through the respective corresponding ports. Each processing element group includes a plurality of processing elements. Each processing element is associated with at least one of a plurality of output neurons and performs a multiply-and-accumulate computation in which a value of at least one input neuron connected to a corresponding output neuron is multiplied by a weight coefficient and results of multiplication are accumulated.

9 Claims, 28 Drawing Sheets

(51) Int. Cl.
*G06F 7/523* (2006.01)
*G06F 7/544* (2006.01)
*G06N 3/048* (2023.01)
*G06N 3/063* (2023.01)

(56) References Cited

U.S. PATENT DOCUMENTS

| | | | |
|---|---|---|---|
| 2004/0030712 A1* | 2/2004 | Sano | H04L 49/25 |
| | | | 707/999.102 |
| 2008/0077926 A1* | 3/2008 | Jeter | G06F 9/524 |
| | | | 718/102 |
| 2011/0235531 A1* | 9/2011 | Vangal | H04L 49/109 |
| | | | 370/252 |
| 2013/0073498 A1* | 3/2013 | Izhikevich | G06N 3/049 |
| | | | 706/15 |
| 2015/0324690 A1* | 11/2015 | Chilimbi | G06N 3/063 |
| | | | 706/27 |
| 2016/0283240 A1* | 9/2016 | Mishra | G06F 9/30018 |
| 2018/0039480 A1 | 2/2018 | Komagata et al. | |
| 2018/0046894 A1* | 2/2018 | Yao | G06N 3/045 |
| 2018/0082181 A1* | 3/2018 | Brothers | G06N 3/045 |
| 2018/0096226 A1* | 4/2018 | Aliabadi | G06V 10/82 |
| 2019/0042538 A1* | 2/2019 | Koren | G06N 3/063 |
| 2019/0303297 A1* | 10/2019 | Fleming, Jr. | G06F 13/1668 |

FOREIGN PATENT DOCUMENTS

| | | | | |
|---|---|---|---|---|
| CN | 108268943 A | * | 7/2018 | ............ G06F 30/327 |
| EP | 3343460 A1 | * | 7/2018 | ............ G06N 3/0445 |
| EP | 3557425 A1 | * | 10/2019 | ......... G06F 12/0846 |
| EP | 3557485 A1 | * | 10/2019 | ......... G06F 12/0207 |
| JP | H02300870 A | | 12/1990 | |
| JP | 6205780 B1 | * | 12/2017 | |
| JP | 2018022339 A | | 2/2018 | |
| WO | WO-2018108126 A1 | * | 6/2018 | ............ G06F 17/16 |
| WO | WO-2018120989 A1 | * | 7/2018 | ........... G06F 17/153 |
| WO | WO-2018193353 A1 | * | 10/2018 | ........... G06F 9/3802 |

OTHER PUBLICATIONS

Shaoli Liu, etc., "Cambricon: An Instruction Set Architecture for Neural Networks", published via 2016 ACM/IEEE 43rd Annual International Symposium on Computer Architecture, Jun. 18-22, 2016, Seoul, South Korea, retrieved Aug. 21, 2024. (Year: 2016).*
Kevin Kiningham, etc., "Design and Analysis of a Hardware CNN Accelerator", published in 2017 and retrieved Aug. 21, 2024 from https://cs231n.stanford.edu/reports/2017/pdfs/116.pdf. (Year: 2017).*
Bryon Moyer, "How Does Scatter/Gather Work?", published Feb. 9, 2017 to https://www.eejournal.com/article/20170209-scatter-gather, retrieved Aug. 21, 2024. (Year: 2017).*
David Whelihan, etc., "P-sync: A Photonically Enabled Architecture for Efficient Non-local Data Access", published via 2013 IEEE 27th International Symposium on Parallel & Distributed Processing, May 20-24, 2013, retrieved Aug. 21, 2024. (Year: 2013).*
Kaiyuan Guo, etc., "A Survey of FPGA-Based Neural Network Inference Accelerator", published via ACM Transactions on Reconfigurable Technology and Systems, vol. 9, No. 4, Article 11, Dec. 2017, retrieved Aug. 21, 2024. (Year: 2017).*
Edouard Oyallon, etc., "Scaling the Scattering Transform: Deep Hybrid Networks", published via 2017 IEEE International Conference on Computer Vision, Oct. 22-29, 2017, Venice, Italy, retrieved Aug. 21, 2024. (Year: 2017).*
International Search Report (PCT/ISA/210), with translation, and Written Opinion (PCT/ISA/237) mailed on Apr. 16, 2019, by the Japanese Patent Office as the International Searching Authority for International Application No. PCT/JP2019/002780.
Musha, et al., "Deep Learning Acceleration in Large-Scale Multi-FPGA System", The Institute of Electronics, Information and Communication Engineers, Oct. 2017, vol. 117, No. 278, pp. 1-6.
Ohba, et al., "Broadcasting of Data Transfer in Multicore Neural Network Accelerator", IPSJ SIG Technical Report, Mar. 2017, pp. 1-6.
Zhang, et al., "Cambricon-X: An Accelerator for Sparse Neural Networks," Proceedings of 49th IEEE/ACM International Symposium on Microarchitecture, 2016 (month unknown), 12 pages.
Office Action dated Nov. 16, 2021, issued in corresponding Japanese Patent Application No. 2020-518966, 8 pages including 4 pages of English translation.

* cited by examiner

FIG.5
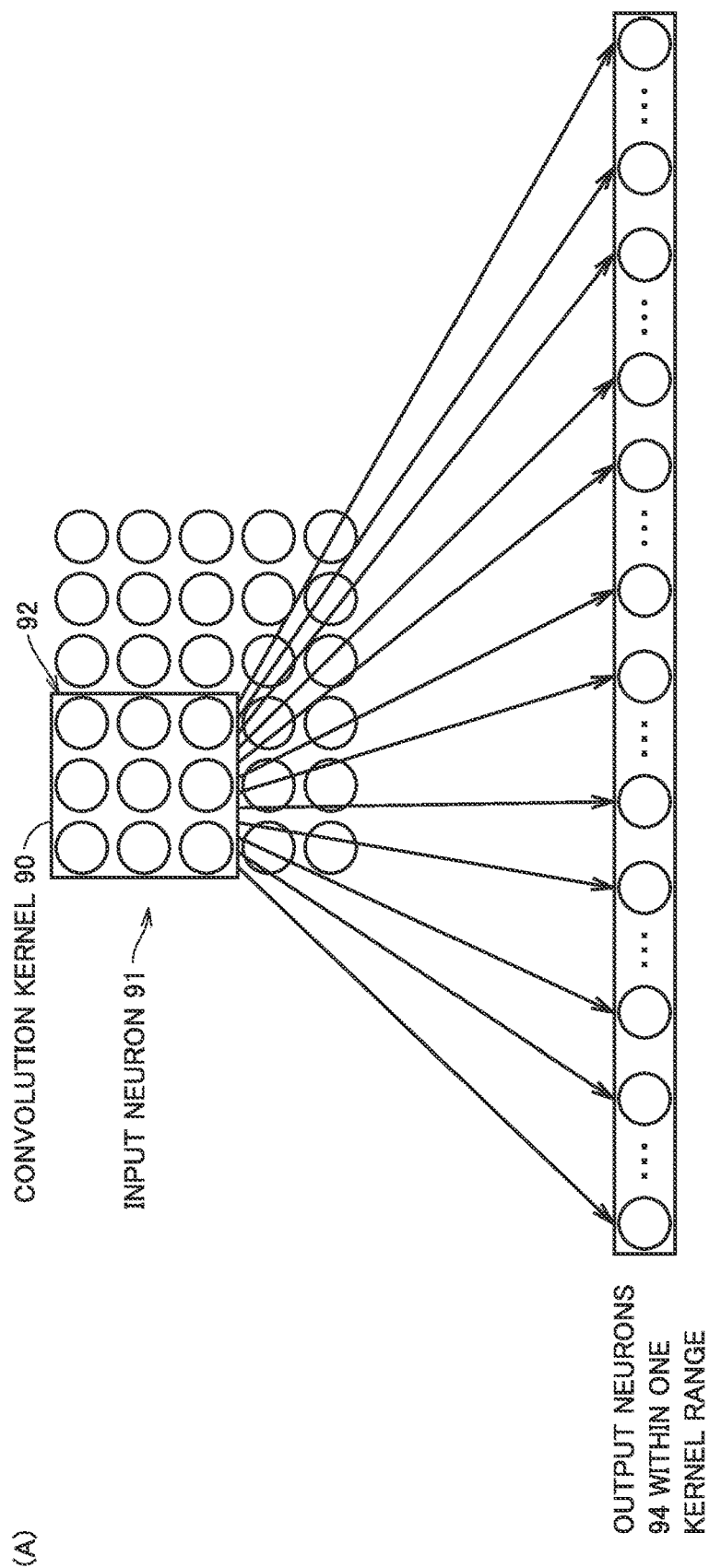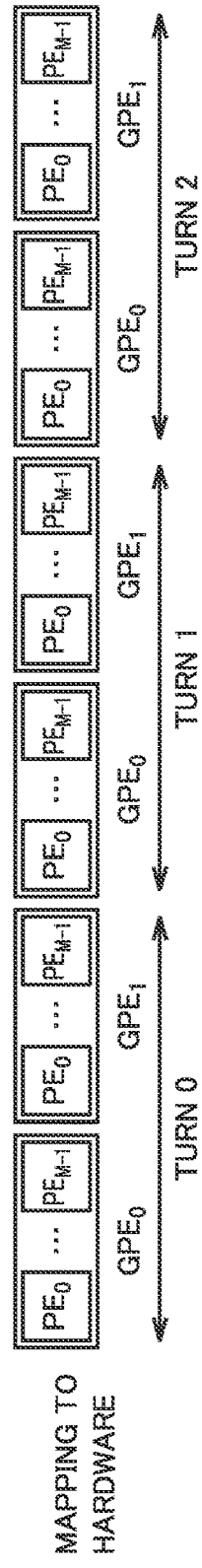

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $idx_{n,0}$ | 1 | 0 | 1 | 0 | 0 | 1 | 1 | 0 | 0 | 1 | 0 | 1 | 1 | 0 | 0 | 0 |
| $idx_{n,1}$ | 1 | 0 | 0 | 0 | 0 | 1 | 1 | 1 | 0 | 1 | 1 | 0 | 1 | 0 | 0 | 0 |
| $idx_{n,2}$ | 1 | 0 | 1 | 0 | 0 | 1 | 0 | 1 | 0 | 1 | 0 | 0 | 1 | 0 | 0 | 1 |

(B)

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $Uidx_{n,i}$ | 1 | 0 | 1 | 0 | 0 | 1 | 1 | 0 | 1 | 1 | 1 | 1 | 0 | 0 | 0 | 1 |

(C)

| $Idx_n$ | 0 | 2 | 5 | 6 | 7 | 9 | 10 | 11 | 12 | 15 |
|---|---|---|---|---|---|---|---|---|---|---|

(D)

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| WEIGHT COEFFICIENT CORRESPONDING TO $y_0$ | | 0 | | 0 | 0 | | | 0 | 0 | | 0 | | | 0 | 0 | 0 |
| WEIGHT COEFFICIENT CORRESPONDING TO $y_1$ | | 0 | 0 | 0 | 0 | | | | | 0 | | 0 | | 0 | 0 | 0 |
| WEIGHT COEFFICIENT CORRESPONDING TO $y_2$ | | 0 | | 0 | 0 | | 0 | | 0 | | 0 | 0 | | 0 | 0 | |

(E)

| | 0 | 2 | 5 | 6 | 7 | 9 | 10 | 11 | 12 | 15 |
|---|---|---|---|---|---|---|---|---|---|---|
| $W_{n,0}$ | | | | | 0 | | 0 | | | 0 |
| $W_{n,1}$ | | 0 | | | | | 0 | 0 | | |
| $W_{n,2}$ | | | | 0 | | | 0 | 0 | | |

FIG.25
(A)
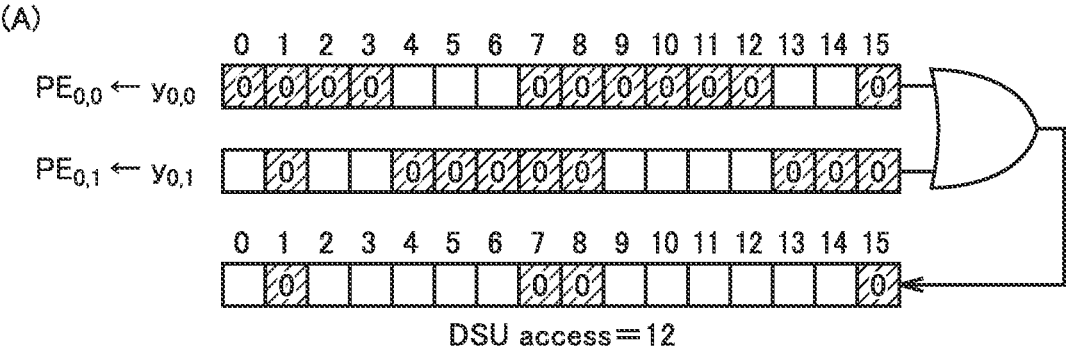
DSU access=12
(B)
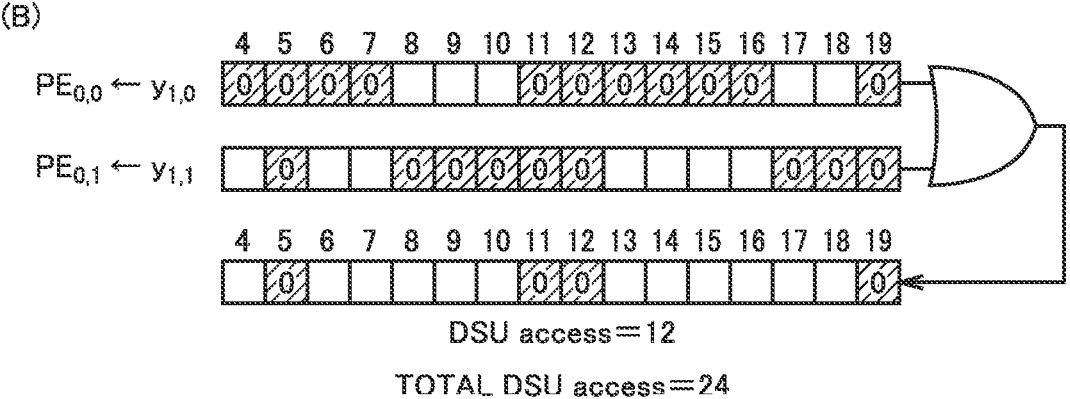
DSU access=12
TOTAL DSU access=24

ARITHMETIC DEVICE

TECHNICAL FIELD

This disclosure relates to an arithmetic device, and relates, for example, to an arithmetic device that performs a computation in a convolutional layer of a neural network.

BACKGROUND ART

It has been known in an algorithm of a neural network that, by making connection among neurons between layers sparse, processing can be faster owing to reduction in amount of computation and a capacity of a memory for storing a weight coefficient can be reduced.

In spite of sparse connection among neurons, however, performance and power consumption of an existing arithmetic device dedicated for a neural network are not necessarily improved. NPL 1 has proposed an inference arithmetic device directed to a convolutional layer of a sparse neural network.

Specifically, according to this literature, an arithmetic device includes a buffer controller (BC) and a plurality of processing elements (PE) connected in parallel to one another. A value of one output neuron is calculated in any processing element. The plurality of processing elements asynchronously operate in parallel.

The buffer controller controls an input data buffer to selectively supply input data required by each processing element to each processing element. More specifically, the buffer controller includes: an internal storage area where some of data copied from the input data buffer is stored; and a plurality of index modules that individually correspond to the processing elements and supply data to respective corresponding processing elements.

CITATION LIST

Non Patent Literature

NPL 1: Shijin Zhang, et al., "Cambricon-X: An Accelerator for Sparse Neural Networks," Proceedings of 49th IEEE/ACM International Symposium on Microarchitecture, 2016

SUMMARY OF INVENTION

Technical Problem

In a configuration in NPL 1, n processing elements are provided. In this case, the buffer controller should include n ports for simultaneous access to n processing elements, or when each processing element includes p computation units that operate in parallel, the buffer controller should include n×p ports that can allow simultaneous access.

In order to improve processing performance of an arithmetic device, it is effective to increase the number n of processing elements or the number p of computation units in the processing element. According to the configuration of the arithmetic device in NPL 1, however, the number of ports for accessing the internal storage area in the buffer controller increases in proportion to the number n×p of processing elements. Such increase in number of ports brings about increase in circuit area and lowering in operating frequency. Therefore, scalable improvement in performance of the arithmetic device with increase in number n of processing elements and number p of internal computation units cannot be achieved.

This disclosure takes into consideration the problems above, and one of objects thereof is to provide an arithmetic device that allows scalable improvement in performance with increase in number of processing elements or increase in number of computation units within the processing element, in a convolutional layer of a neural network where connection between layers is made sparse.

Solution to Problem

An arithmetic device in one embodiment is an arithmetic device for a computation in a convolutional layer of a convolutional neural network. The convolutional layer includes a plurality of input neurons and a plurality of output neurons each connected to at least one of the plurality of input neurons. The arithmetic device includes a first register that stores input data as values of the plurality of input neurons, a plurality of ports, and a plurality of processing element groups that correspond to the plurality of ports, respectively, and can access the first register through respective corresponding ports. Each of the processing element groups includes a plurality of processing elements. Each of the processing elements is associated with at least one of the plurality of output neurons and performs a multiply-and-accumulate computation in which a value of at least one input neuron connected to a corresponding output neuron is multiplied by a weight coefficient and a result of multiplication is accumulated.

Advantageous Effects of Invention

According to the embodiment, since a processing element group including a plurality of processing elements accesses the first register through a corresponding port, performance thereof can scalably be improved with increase in number of processing elements or increase in number of computation units within the processing element.

BRIEF DESCRIPTION OF DRAWINGS

FIG. 5 is a conceptual diagram of mapping of a calculation algorithm of a convolutional layer to hardware.

FIG. 11 is a diagram for illustrating an exemplary method of creating storage data of an index string and a weight coefficient string.

FIG. 25 is a diagram for illustrating the number of times of access to the data scatter unit in allocation in the arithmetic device in FIG. 24 (A).

DESCRIPTION OF EMBODIMENTS

Figure 1:
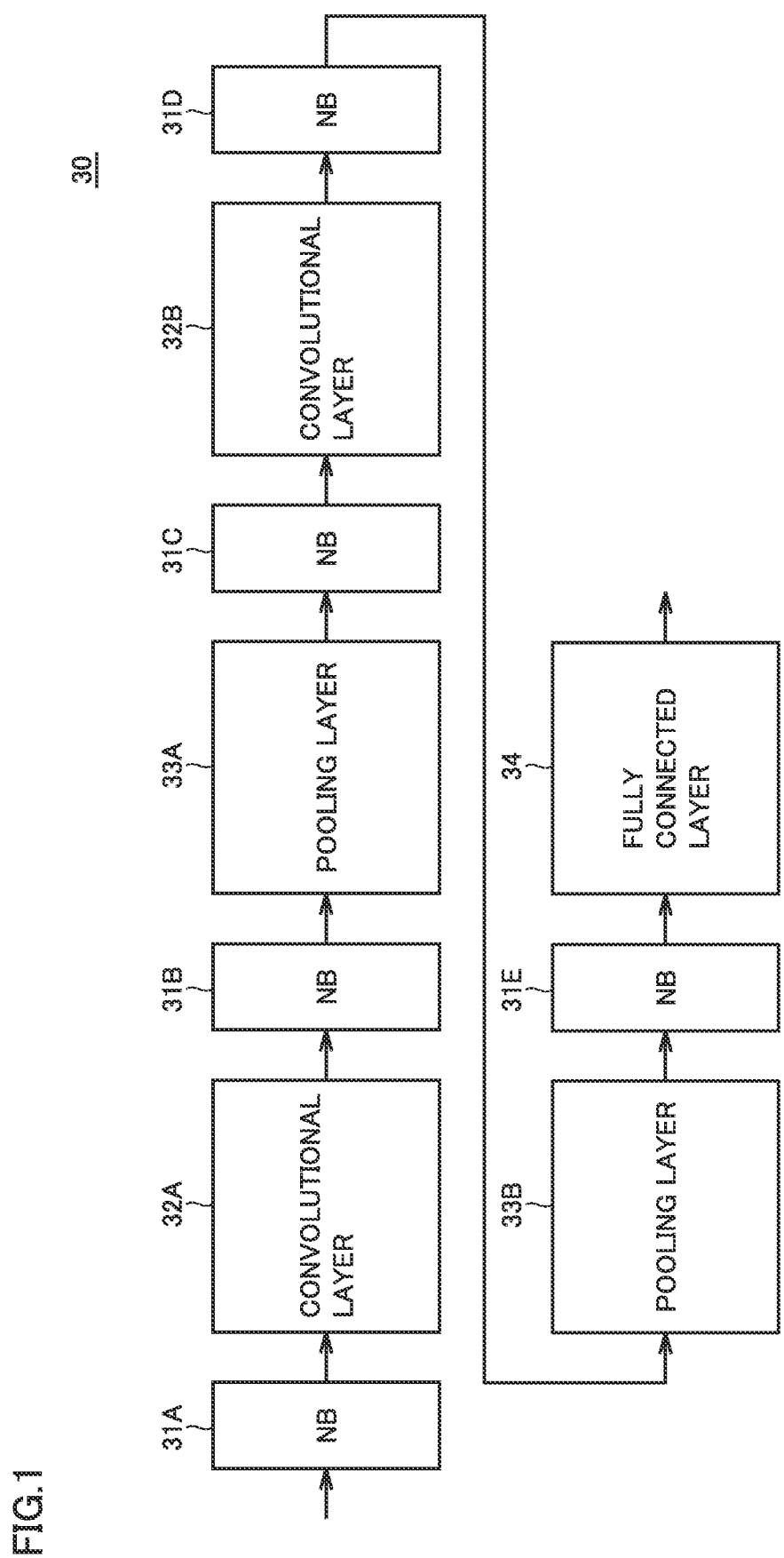
FIG. 1 is a block diagram showing an exemplary configuration of a sparse neural network.

Each embodiment will be described below in detail with reference to the drawings. The same or corresponding elements have the same reference characters allotted and description thereof will not be repeated.

First Embodiment

[Exemplary Configuration of Neural Network]

FIG. 1 is a block diagram showing an exemplary configuration of a sparse neural network. Referring to FIG. 1, a neural network 30 includes such a structure that a plurality of convolutional layers 32A and 32B and a plurality of pooling layers 33A and 33B are connected in series with neuron buffers 31A, 31B, 31C, 31D, and 31E being interposed. Neural network 30 is also referred to as a convolutional neural network.

Each neuron buffer 31 is used for temporarily storing data output from a preceding layer and/or temporarily storing data to be input to a next layer. For example, neuron buffer 31A corresponds to a plurality of input neurons of convolutional layer 32A. Neuron buffer 31B corresponds to a plurality of output neurons of convolutional layer 32A and to a plurality of input neurons of pooling layer 33A.

Each convolutional layer 32 multiplies a value of at least one input neuron connected for each output neuron by a weight coefficient and adds up results of multiplication. This computation is referred to as a multiply-and-accumulate computation. Each convolutional layer 32 adds a bias value to a result of the multiply-and-accumulate computation and applies an activation function (for example, a non-linear computation) to a result of addition.

Figure 2:
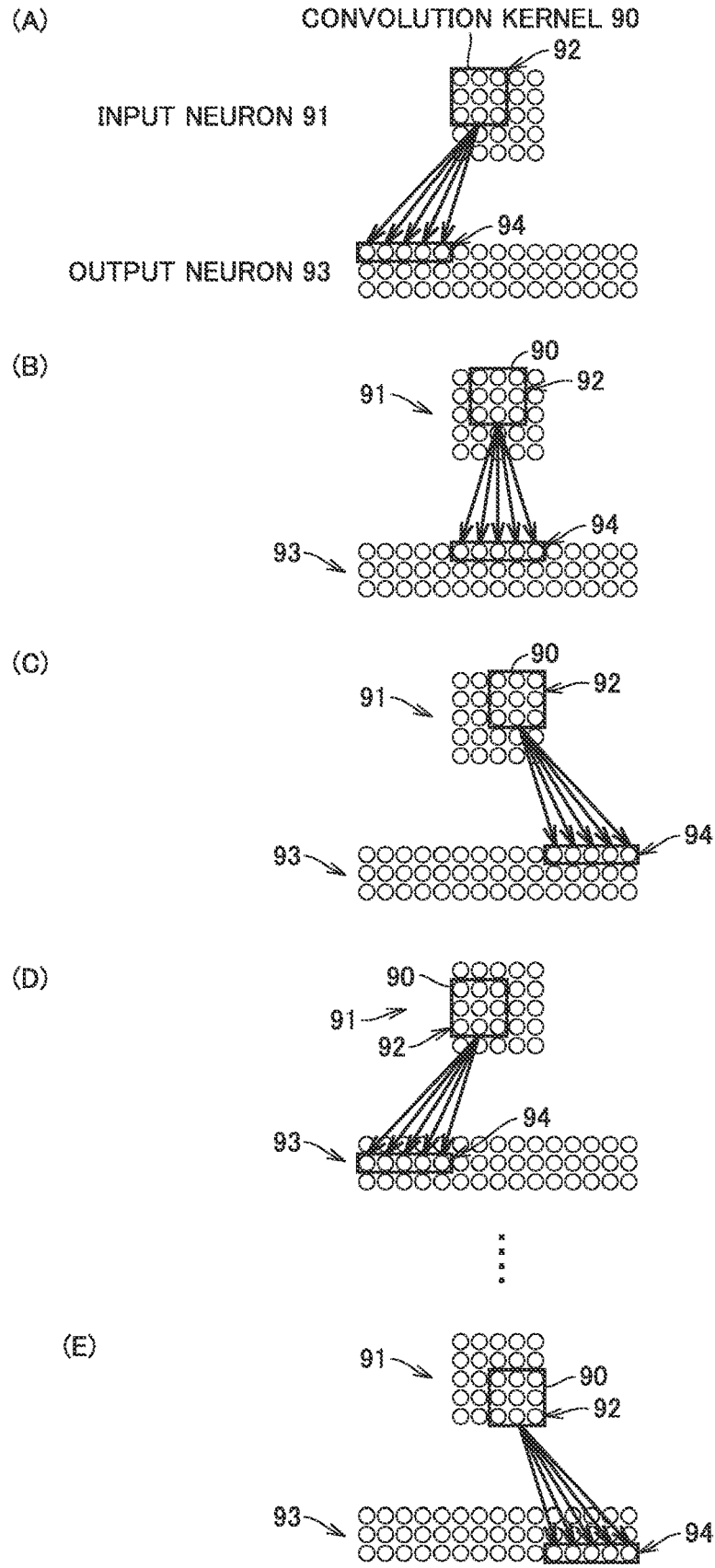
FIG. 2 is a conceptual diagram showing a calculation algorithm of a convolutional layer.

FIG. 2 is a conceptual diagram showing a calculation algorithm of a convolutional layer. In FIG. 2, a calculation proceeds in the order from (A) to (E).

Referring to FIG. 2, of input neurons 91, neurons 92 within a range of a convolution kernel 90 are selected and a multiply-and-accumulate computation with convolution kernel 90 is performed. The kernel refers to a weight coefficient matrix and it is also referred to as a filter. In the example in FIG. 2, a kernel different for each output channel is applied to input neurons 92 (input data) within a range of the same convolution kernel 90. Values of output neurons 94 as many as a plurality of output channels are calculated. A result of the multiply-and-accumulate computation is stored as values of output neurons 94 among output neurons 93 within a range corresponding to selected input neurons 92.

After the computation within the range of one kernel is completed, convolution kernel 90 is slid and the multiply-and-accumulate computation is similarly performed. When all computations with the kernel being slid in a horizontal direction and a vertical direction are completed, processing in the convolutional layer is completed.

Specifically, in the example in FIG. 2, initially, convolution kernel 90 is slid by a certain distance (one by one in the example in FIG. 2) in the horizontal direction. When sliding in the horizontal direction from the left end to the right end is completed ((A) to (C) in FIG. 2), convolution kernel 90 is moved by a certain distance (by one in the example in FIG. 2) in the vertical direction ((D) in FIG. 2) and the multiply-and-accumulate computation is performed while convolution kernel 90 is again slid from the left end to the right end. Thus, until all computations with the kernel being slid in the horizontal direction and the vertical direction are completed (up to (E) in FIG. 2), the computation is repeated.

Referring again to FIG. 1, each pooling layer 33 reduces a size of input data by performing an operation for integration into one element, for each local area of a plurality of input neurons. For example, each pooling layer 33 takes a maximum value of values of input neurons in a local area or averages values of input neurons in the local area.

As shown in FIG. 1, one fully connected layer or a plurality of fully connected layers in which each output neuron has connection to all input neurons is/are provided at a terminal of the neural network.

[Exemplary Configuration of Convolutional Layer]

Figure 3:
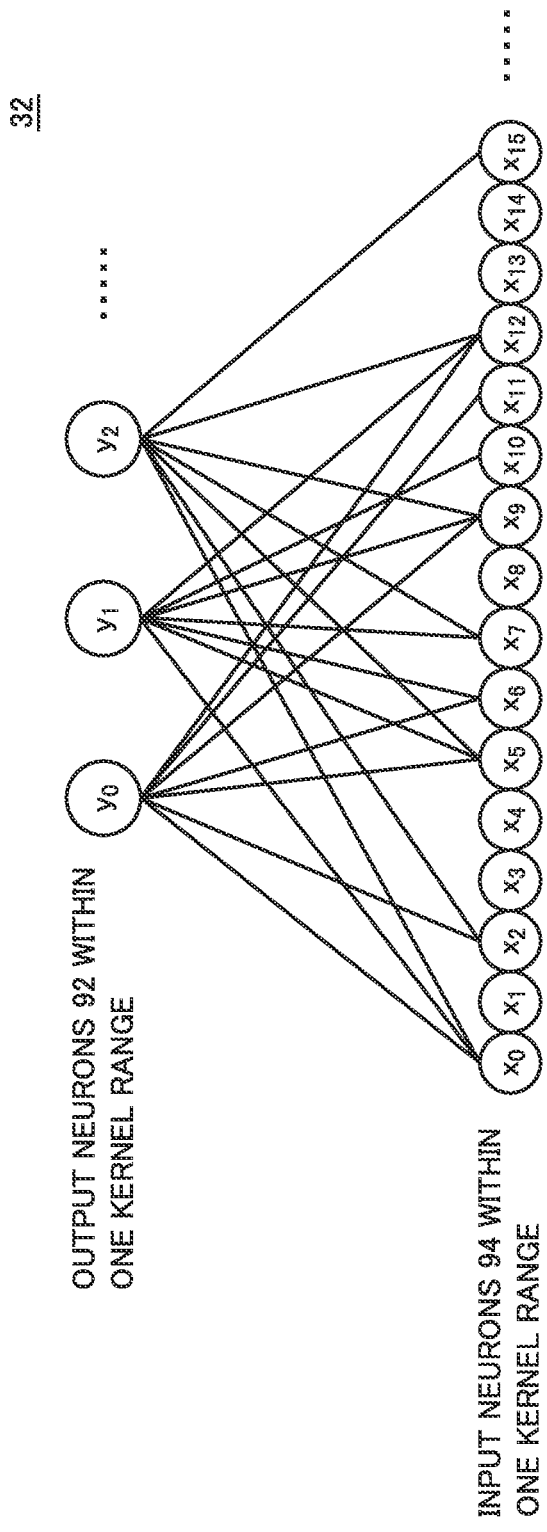
FIG. 3 is a conceptual diagram showing a specific example of a calculation algorithm for one kernel range in a convolutional layer in a sparse neural network.

FIG. 3 is a conceptual diagram showing a specific example of a calculation algorithm for one kernel range in a convolutional layer in a sparse neural network.

Referring to FIG. 3, in convolutional layer 32, a plurality of input neurons $x_0, x_1, x_2, \ldots$ are connected to a plurality of output neurons $y_0, y_1, y_2, \ldots$ for each kernel range. Specifically, in the example in FIG. 3, in order to calculate values of output neurons $y_0$, $y_1$, and $y_2$, a multiply-andaccumulate computation is performed in accordance with expressions (1A) to (1C) below, and thereafter an activation function is applied in accordance with expressions (2A) to (2C) below.

$$y_0 \leftarrow w_{0,0} \cdot x_0 + w_{0,2} \cdot x_2 + w_{0,5} \cdot x_5 + w_{0,6} \cdot x_6 + w_{0,9} \cdot x_9 + w_{0,11} \cdot x_{11} + w_{0,12} \cdot x_{12} \quad (1A)$$

$$y_1 \leftarrow w_{1,0} \cdot x_0 + w_{1,5} \cdot x_5 + w_{1,6} \cdot x_6 + w_{1,7} \cdot x_7 + w_{1,9} \cdot x_9 + w_{1,10} \cdot x_{10} + w_{1,12} \cdot x_{12} \quad (1B)$$

$$y_2 \leftarrow w_{2,0} \cdot x_0 + w_{2,2} \cdot x_2 + w_{2,5} \cdot x_5 + w_{2,7} \cdot x_7 + w_{2,9} \cdot x_9 + w_{2,12} \cdot x_{12} + w_{2,15} \cdot x_{15} \quad (1C)$$

$$y_0 \leftarrow f_0(y_0) \quad (2A)$$

$$y_1 \leftarrow f_1(y_1) \quad (2B)$$

$$y_2 \leftarrow f_2(y_2) \quad (2C)$$

In the expressions (1A) to (1C), $w_{ij}$ ($0 \leq i \leq 2$, $0 \leq j \leq 15$) represents a weight coefficient. A bias value may be added to each of $y_0$, $y_1$, and $y_2$. In the expressions (2A) to (2C), $f_0$, $f_1$, and $f_2$ each represent an activation function.

The multiply-and-accumulate computation in the expressions (1A) to (1C) can be divided into a first stage of taking out an element necessary for the multiply-and-accumulate computation from input neurons $x_0$, $x_1$, . . . , and $x_{15}$, a second stage of multiplying the element taken out in the first stage by a corresponding weight coefficient, and a third stage of adding up results of multiplication.

In the first stage, values aligned in an order of index numbers of input neurons $x_0$, $x_1$, . . . , and $x_{15}$ are referred to as a "usage bit string," with a value corresponding to an element necessary for the multiply-and-accumulate computation being defined as "1" and a value corresponding to an element unnecessary for the multiply-and-accumulate computation being defined as "0". The usage bit string in the example in the expression (1A) is expressed as (1, 0, 1, 0, 0, 1, 1, 0, 0, 1, 0, 1, 1, 0, 0, 0). The usage bit string in the example in the expression (1B) is expressed as (1, 0, 0, 0, 0, 1, 1, 1, 0, 1, 1, 0, 1, 0, 0, 0). The usage bit string in the example in the expression (1C) is expressed as (1, 0, 1, 0, 0, 1, 0, 1, 0, 1, 0, 0, 1, 0, 0, 1).

[Overall Configuration of Arithmetic Device]

Figure 4:
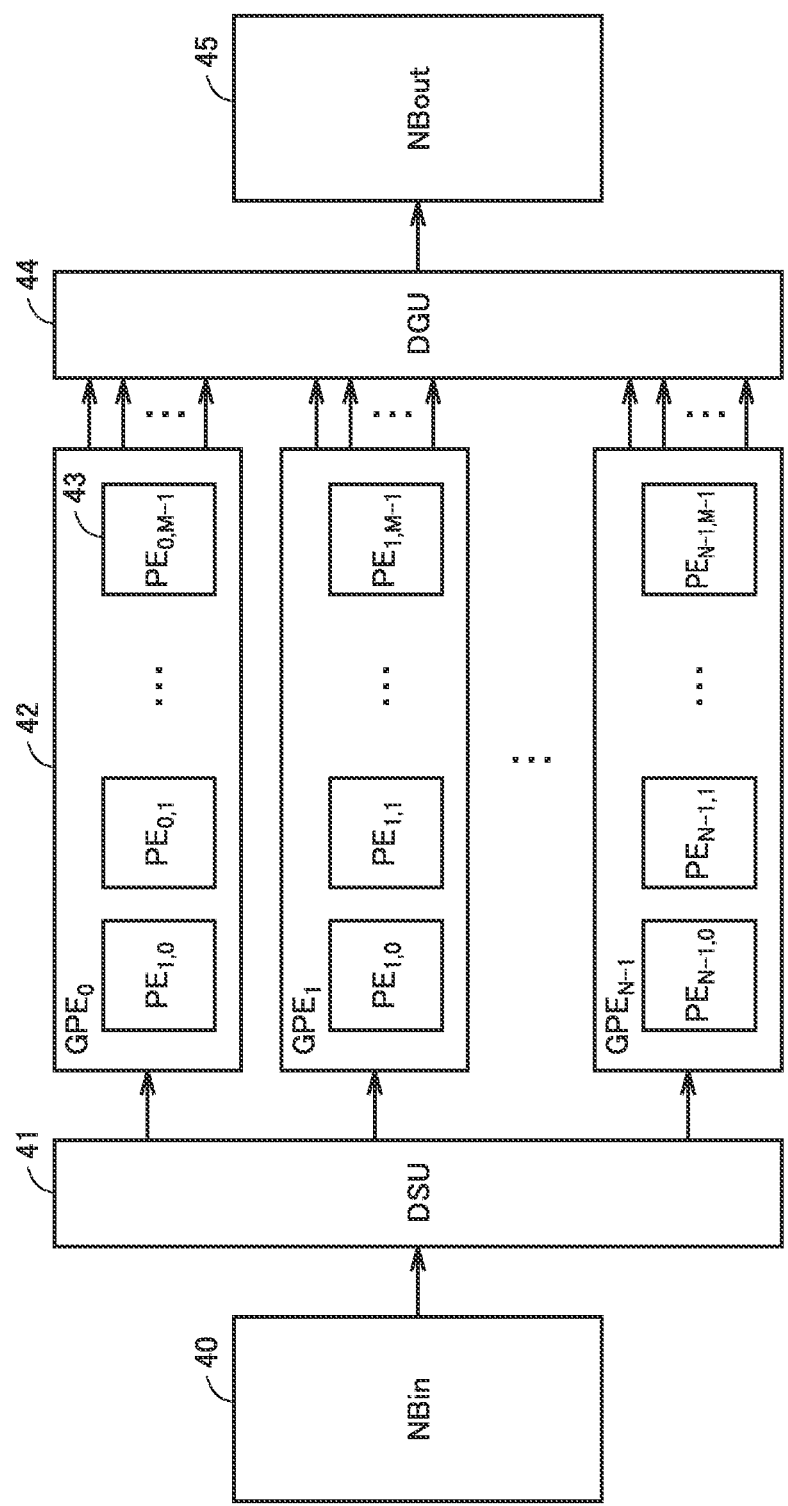
FIG. 4 is a block diagram showing an overall configuration of an arithmetic device that carries out a calculation in a convolutional layer.

FIG. 4 is a block diagram showing an overall configuration of an arithmetic device that carries out a calculation in a convolutional layer. In FIG. 4, neuron buffer 31 on an input side and neuron buffer 31 on an output side described with reference to FIG. 3 are included in the configuration of the arithmetic device, as an input data buffer and an output data buffer, respectively.

Referring to FIG. 4, an arithmetic device 39 includes N processing element groups (GPE$_0$ to GPE$_{N-1}$, GPE) 42, an input data buffer (NBin) 40, a data scatter unit (DSU) 41, a data gather unit (DGU) 44, and an output data buffer (NBout) 45.

Each processing element group (GPE) 42 includes a plurality of processing elements 43 (PE). Each processing element (PE) 43 performs a multiply-and-accumulate computation for each output neuron. Specifically, in the example in FIG. 4, each processing element group 42 includes M processing elements (PE) 43. Specifically, an ith ($0 \leq i \leq N-1$) processing element group 42 (GPE$_i$) includes M processing elements 43 of PE$_{i,0}$, PE$_{i,1}$, . . . , and PE$_{i,M-1}$.

Input data buffer (NBin) 40 stores a result of computation in the preceding layer as a value of each input neuron in a subject layer.

Data scatter unit (DSU) 41 holds some of data in input data buffer 40 and accepts an access request from each processing element group (GPE) 42. Data to which access has been requested (that is, a value of an input neuron) is transferred to processing element group (GPE) 42 that has issued the request.

Data gather unit (DGU) 44 gathers results of computations by processing elements (PE) 43, applies an activation function to the gathered results of computation, and further aligns and synchronizes the results.

Output data buffer (NBout) 45 stores the results of computation in the subject layer as values of the output neurons.

[Mapping of Calculation Algorithm within One Kernel Range to Hardware]

FIG. 5 is a conceptual diagram of mapping of a calculation algorithm of one kernel range in a convolutional layer to hardware.

As described with reference to FIG. 4, data scatter unit (DSU) 41 copies values of input neurons 92 among input neurons 91 within a range of one convolution kernel 90 to an embedded register (corresponding to a data scatter register (DSR) 50 in FIG. 7). Basically, one processing element (PE) 43 is associated with each of output neurons 94 within one kernel range.

As shown in FIG. 5, when the number of output neurons 94 within one kernel range is larger than the total number of processing elements (PE) 43, arithmetic device 39 divides output neurons 94 within one kernel range into a plurality of turns. Then, one processing element (PE) 43 is associated with each output neuron for each turn, and the multiply-and-accumulate computation of the corresponding output neuron is performed in each processing element (PE) 43. Therefore, each processing element (PE) performs a computation of output neurons different for each turn.

Figure 10:
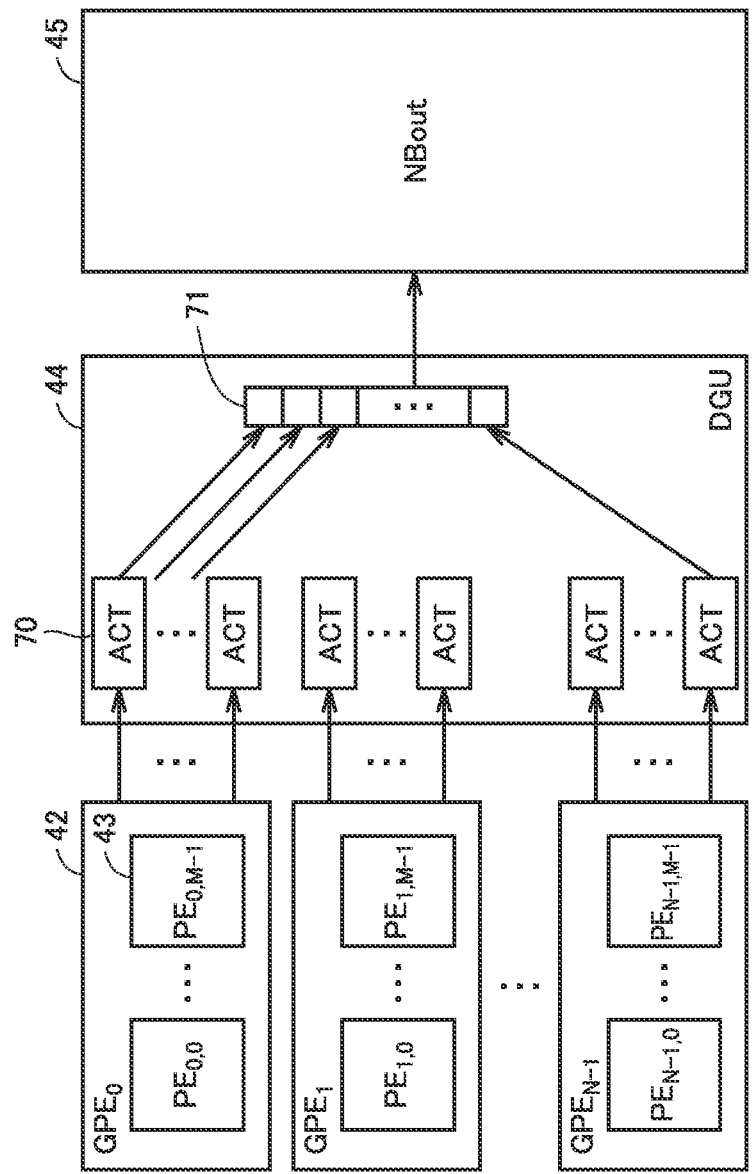
FIG. 10 is a block diagram showing an exemplary configuration of a data gather unit in FIG. 4.

A result of computation in each processing element (PE) 43 is temporarily stored in an embedded register (corresponding to a data gather register (DGR) 71 in FIG. 10) in data gather unit (DGU) 44. When all multiply-and-accumulate computations corresponding to output neurons 94 within one kernel range are completed, data gather unit (DGU) 44 moves data from data gather register (DGR) 71 to output data buffer (NBout) 45.

As described with reference to FIG. 2, processing above is repeatedly performed with convolution kernel 90 being slid. The example in FIG. 5 will specifically be described below.

Referring to FIG. 5, arithmetic device 39 includes two processing element groups GPE$_0$ and GPE$_1$ as processing element groups (GPE) 42. Each processing element group (GPE) 42 includes M processing elements PE$_0$ to PE$_{M-1}$ as processing elements (PE) 43. Therefore, 2×M processing elements (PE) 43 are provided in arithmetic device 39 as a whole. When the number of output neurons 94 within one kernel range is larger than 2×M which is the number of processing elements (PE) 43, as shown in FIG. 5 (B), mapping to (association with) processing elements (PE) 43 is carried out every 2×M output neurons. Therefore, as shown in FIG. 5 (A), output neurons 94 within one kernel range are divided into a turn 0, a turn 1, . . . every 2×M elements.

[Procedure of Processing in Arithmetic Device]

Figure 6:
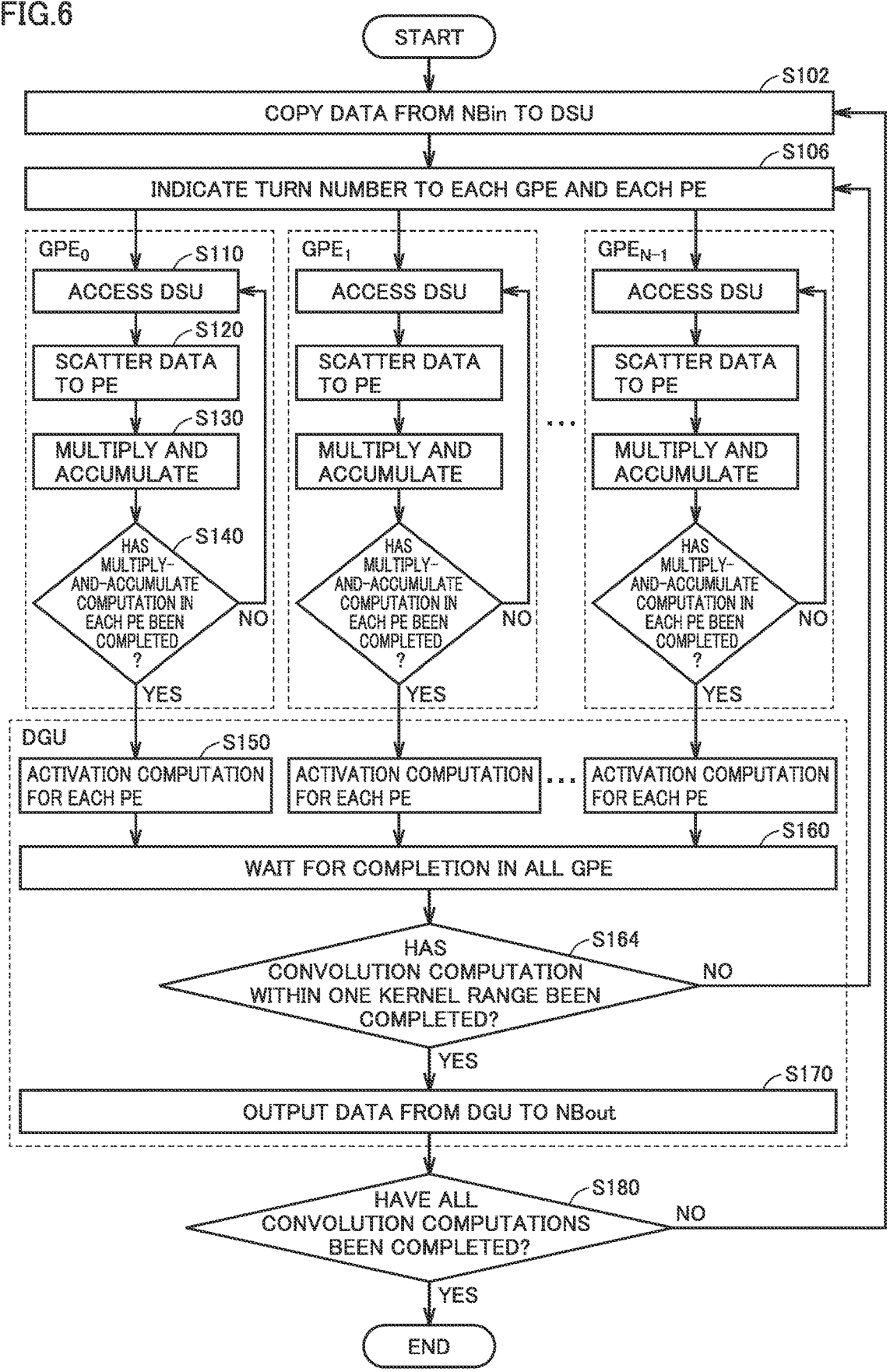
FIG. 6 is a flowchart showing a procedure of processing in the arithmetic device in FIG. 4.

FIG. 6 is a flowchart showing a procedure of processing in the arithmetic device in FIG. 4.

Referring to FIGS. 4 and 6, initially, in step S102, data scatter unit (DSU) 41 takes in data necessary for a convolution computation within one kernel range from input data buffer (NBin) 40. Specifically, data necessary for a convolution computation for one kernel is copied from input data buffer (NBin) 40 to data scatter unit (DSU) 41.

As described previously, the convolution kernel refers to a weight coefficient matrix and it is also referred to as a filter. In a computation in the convolutional layer of the neural network, the convolution kernel is applied to input data while it is slid.

In next step S106, arithmetic device 39 indicates a turn number to each processing element group (GPE) 42 and each processing element (PE) 43. When the number of output neurons 94 within one kernel range is equal to or smaller than the total number of processing elements (PE) 43, a notification about the turn number is given only once (for example, a notification of number 0 is given as the turn number). When the number of output neurons 94 within one kernel range is larger than the total number of processing elements (PE) 43, arithmetic device 39 gives a notification about the turn number (0, 1, 2, . . . ) in performing the multiply-and-accumulate computation corresponding to output neurons in each turn.

In next step S110, processing element groups (GPE) 42 read necessary data from data scatter unit (DSU) 41 by accessing data scatter unit (DSU) 41 in parallel. A value of an index of an accessed input neuron is different for each turn.

In next step S120, processing element group (GPE) 42 scatters read data to processing elements (PE) 43 included in the processing element group itself.

In next step S130, each processing element (PE) 43 multiplies scattered data by a corresponding weight coefficient and accumulates a result of multiplication in an internal register. A value of the weight coefficient is different for each turn.

Steps S110, S120, and S130 above are performed in parallel in processing element groups (GPE) 42. In each processing element group (GPE) 42, until the multiply-and-accumulate computation in each processing element (PE) 43 is completed (YES in step S140), steps S110 to S130 are repeatedly performed. A bias value may be accumulated to the result of the multiply-and-accumulate computation. A final result of the multiply-and-accumulate computation by each processing element (PE) 43 is transferred to data gather unit (DGU) 44.

In next step S150, data gather unit (DGU) 44 applies an activation function to the result of the multiply-and-accumulate computation by each processing element (PE) 43. Furthermore, in next step S160, data gather unit (DGU) 44 has an embedded register (that is, data gather register (DGR) 71 in FIG. 10) store the result of computation with the activation function onto each processing element (PE) 43 and waits for completion of the computation in all processing elements (PE) 43. Timing of output of the result of completion of the computation in each processing element group (GPE) 42 to a next layer can thus be synchronized.

When output neurons 94 within one kernel range are divided into a plurality of turns, until the convolution computation in all turns is completed (that is, determination as YES is made in step S164), steps from step S106 are repeated. In this case, data gather unit (DGU) 44 has data gather register (DGR) 71 store a result of computation for each turn and waits for completion of the computations by processing elements (PE) 43 in all turns.

In next step S170, data gather unit (DGU) 44 outputs data from the embedded register to output data buffer (NBout) 45. The procedure from step S102 to step S170 is repeated until the convolution computation for all kernels is completed (until determination as YES is made in step S180) while convolution kernel 90 is slid.

[Exemplary Configuration of Data Scatter Unit]

Figure 7:
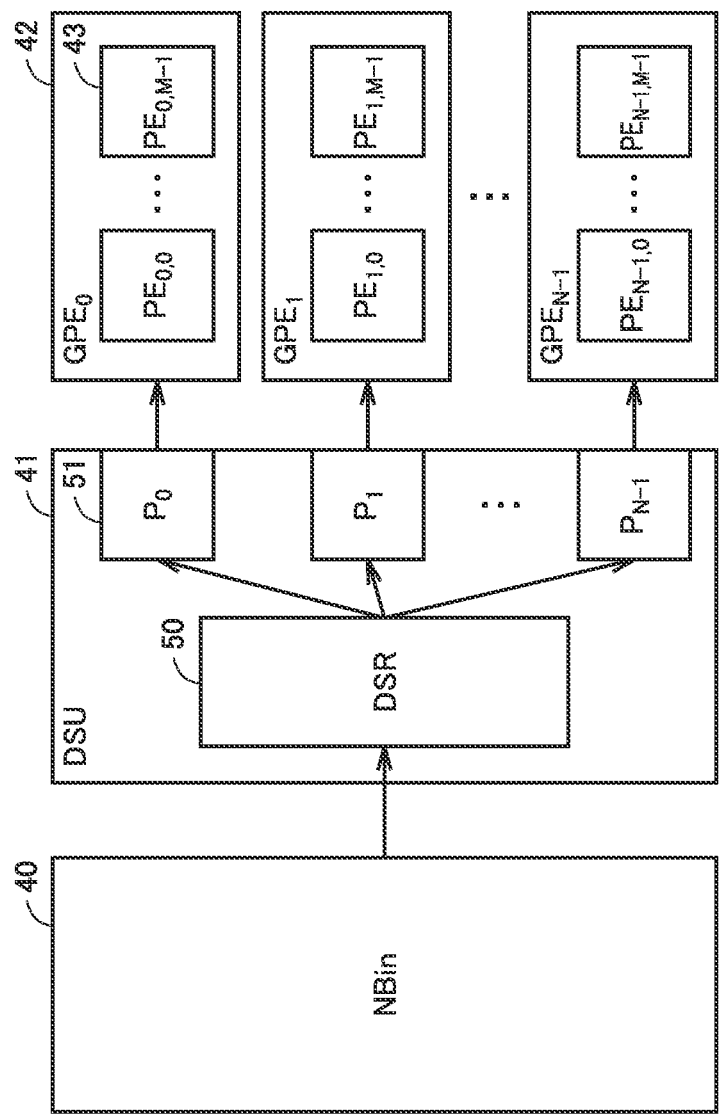
FIG. 7 is a block diagram showing an exemplary configuration of a data scatter unit in FIG. 4.

FIG. 7 is a block diagram showing an exemplary configuration of the data scatter unit in FIG. 4.

Referring to FIG. 7, data scatter unit (DSU) 41 includes data scatter register (DSR) 50 as a first register and N ports ($P_0$, $P_1$, . . . , and $P_{N-1}$) corresponding to N respective processing element groups (GPE) 42.

Data scatter register (DSR) 50 holds some data in input data buffer (NBin) 40. Each port 51 accepts an access request from corresponding processing element group (GPE) 42. Each port 51 takes out data to which access has been requested (a value of an input neuron) from data scatter register (DSR) 50 and transfers the data to corresponding processing element group (GPE) 42.

Thus, in data scatter unit (DSU) 41, an access port for each processing element (PE) is not prepared. As data scatter register (DSR) 50 is configured to be accessible for each processing element group (GPE), increase in number of ports 51 with increase in number of processing elements (PE) 43 can be suppressed.

[Exemplary Configuration of Processing Element Group]

Figure 8:
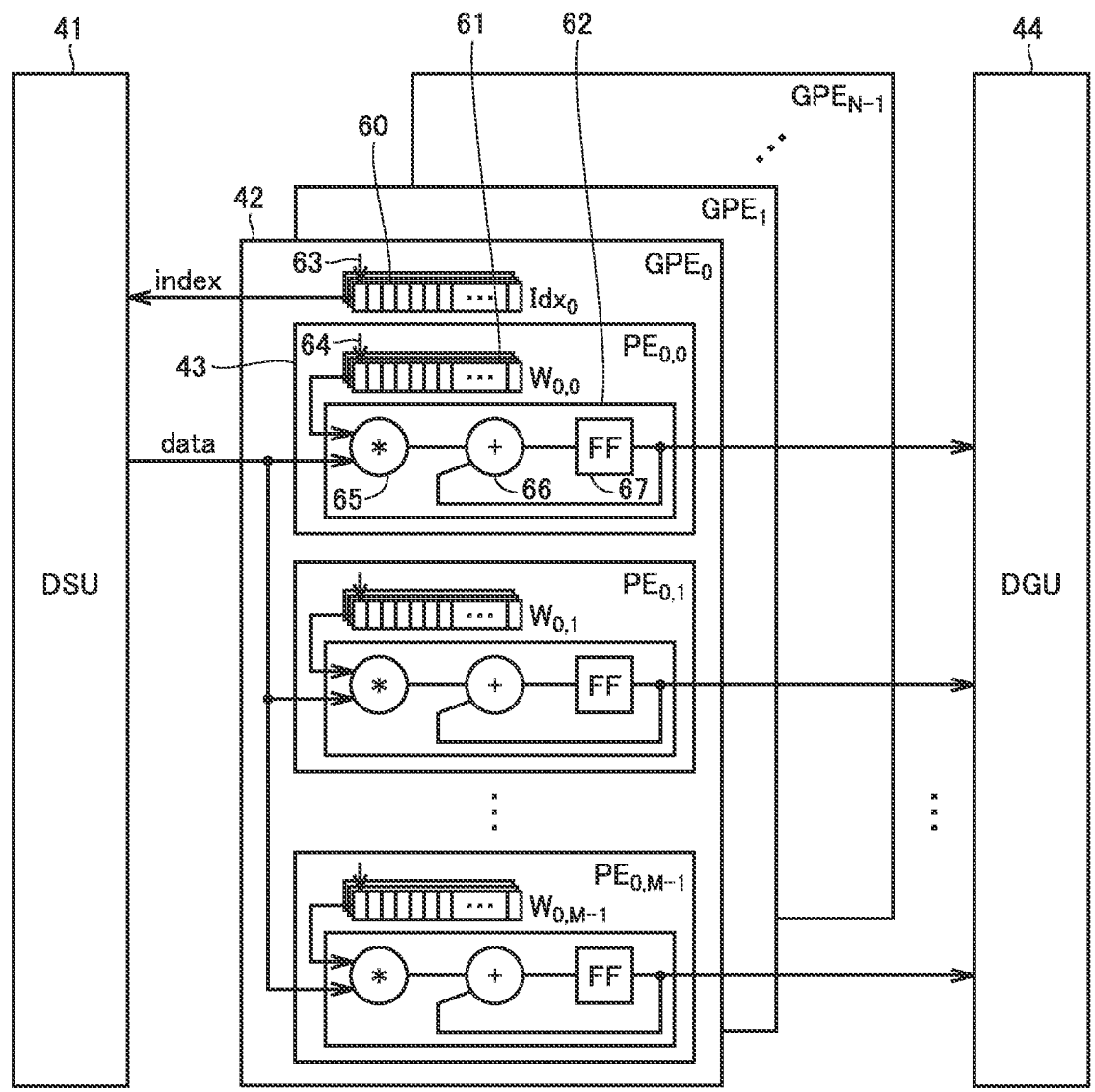
FIG. 8 is a block diagram showing an exemplary configuration of a processing element group in FIG. 4.

FIG. 8 is a block diagram showing an exemplary configuration of the processing element group in FIG. 4.

Referring to FIG. 8, each processing element group (GPE) 42 includes a plurality of (M in the example in FIG. 8) processing elements (PE) 43 and a first memory (which is collectively referred to as an index string memory 60 below) that holds an index string. The index string means an index number string of input neurons necessary for a computation by each processing element (PE) 43 included in processing element group (GPE) 42 (of which specific example will be described with reference to FIGS. 11 and 12). In the example in FIG. 8, processing element groups $GPE_0$, $GPE_1$, . . . , and $GPE_{N-1}$ have respective corresponding index string memories 60 store index strings $Idx_0$, $Idx_1$, . . . , and $Idx_{N-1}$. Since the index string is different for each turn, the index string corresponding to the turn number given from data scatter unit (DSU) 41 is taken out of index string memory 60.

Each processing element (PE) 43 includes a second memory (which is collectively referred to as a weight coefficient string memory 61 below) that holds a weight coefficient used for a multiply-and-accumulate computation for each output neuron and a multiply-and-accumulate computation unit 62. In processing element group $GPE_0$ in FIG. 8, processing elements $P_{0,0}$, $P_{0,1}$, . . . , and $P_{0,M-1}$ store weight coefficient strings $w_{0,0}$, $w_{0,1}$, . . . , and $w_{0,M-1}$ in corresponding weight coefficient string memories 61, respectively. This is also applicable to other processing element groups 42. Since the weight coefficient string is different for each turn, the weight coefficient string corresponding to the turn number given from data scatter unit (DSU) 41 is taken out of weight coefficient string memory 61.

Specifically, in the configuration shown in FIG. 8, index string memory 60 and weight coefficient string memory 61 each include banks as many as the number of turns. By referring to a bank different for each turn in index string memory 60 and weight coefficient string memory 61, an example in which the number of output neurons within one kernel range is larger than the number of processing elements can also be addressed.

The weight coefficient stored in weight coefficient string memory 61 is associated with an index number stored in index string memory 60. A pointer 63 is used for indicating a specific index number stored in index string memory 60 and a pointer 64 is used for indicating a specific weight coefficient stored in weight coefficient string memory 61.

Each processing element group (GPE) 42 takes out an index number indicated by pointer 63 from index string memory 60, and requests data scatter unit (DSU) 41 to provide data (that is, a value of an input neuron) corresponding to the index number. Then, each processing element group (GPE) 42 scatters data (data) obtained from data scatter unit (DSU) 41 to embedded processing elements (PE) 43. Each processing element (PE) 43 takes out a value of the weight coefficient indicated by pointer 64 from weight coefficient string memory 61, multiplies the scattered data by the weight coefficient, and accumulates a result of multiplication.

As the element indicated by pointer 63 is sequentially switched, a similar operation is performed on each element in index string memory 60. Consequently, a value output from each processing element (PE) 43 (that is, a value of each output neuron) before an activation computation is calculated.

Each multiply-and-accumulate computation unit 62 includes a multiplier 65, an adder 66, and a flip flop (FF) 67. Multiplier 65 multiplies data (data) obtained from data scatter unit (DSU) 41 by a weight coefficient taken out of memory 61. Adder 66 adds data held in flip flop 67 to a result of multiplication by multiplier 65 and has a result of addition held in flip flop 67. Results of multiplication by multiplier 65 are thus accumulated.

Figure 9:
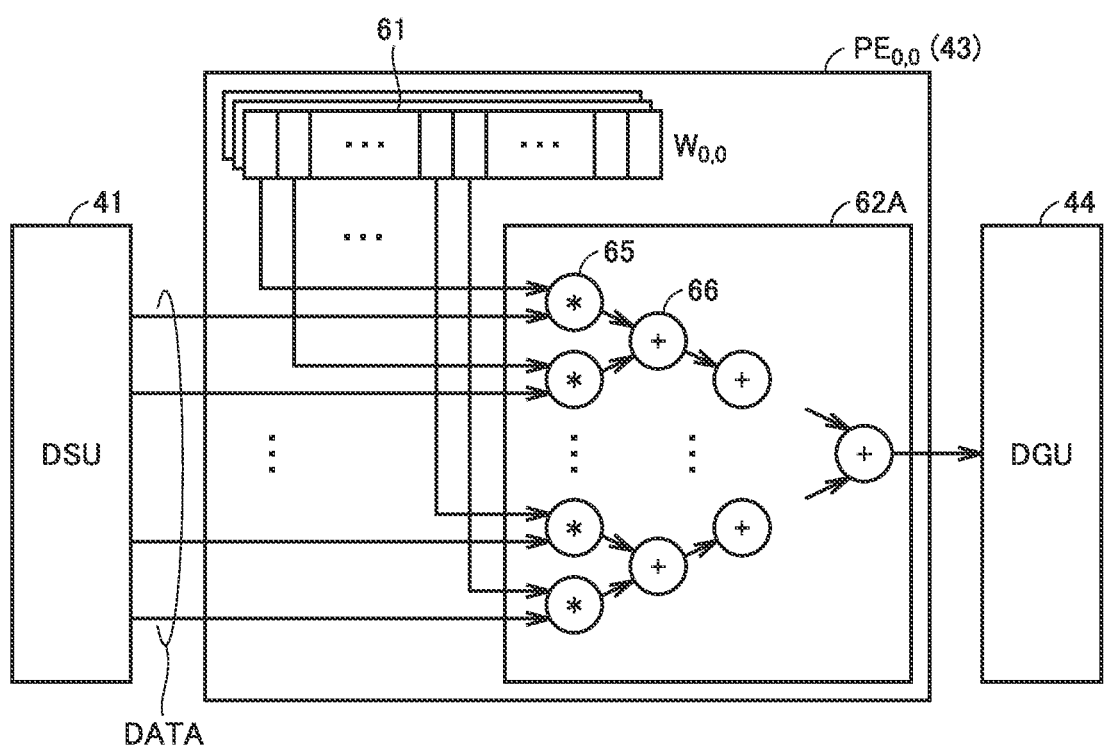
FIG. 9 is a block diagram showing a configuration of a modification of a processing element in FIG. 8.

FIG. 9 is a block diagram showing a configuration of a modification of the processing element in FIG. 8. Though FIG. 9 representatively shows only a configuration of processing element $PE_{0,0}$, the configuration of other processing elements (PE) 43 is also similar.

In processing element (PE) 43 in FIG. 9, a multiply-and-accumulate computation unit 62A is different in configuration from multiply-and-accumulate computation unit 62 in FIG. 8. Specifically, multiply-and-accumulate computation unit 62A in FIG. 9 includes a plurality of multipliers 65 and a plurality of adders 66. The plurality of multipliers 65 are arranged in a first stage of multiply-and-accumulate computation unit 62A. A plurality of adders 66 are arranged in a tree form in a stage second or later. Each adder 66 corresponds to two computation units (multiplier 65 or adder 66) in the preceding stage and adds results of computation by two corresponding computation units. Therefore, one adder 66 in the final stage obtains a result of addition of all outputs from the plurality of multipliers 65.

Each processing element group (GPE) 42 simultaneously requests data scatter unit (DSU) 41 to provide data (DATA) corresponding to index numbers as many as the number of multipliers 65. Data (DATA) corresponding to the plurality of index numbers is scattered to processing elements (PE) 43. In each processing element (PE) 43, the plurality of multipliers 65 multiply taken-out data (DATA) (that is, values of a plurality of input neurons) by corresponding respective weight coefficients.

According to the configuration as above, the number of computation units in parallel within each processing element (PE) 43 can be increased.

Index string memory 60 and weight coefficient string memory 61 described with reference to FIG. 8 may be implemented by a read only memory (ROM) and a fixed value may be stored therein at the time of manufacturing. Alternatively, these memories 60 and 61 may be implemented by a random access memory (RAM) and contents held therein may externally be modified through a control bus or the like.

[Exemplary Configuration of Data Gather Unit]

FIG. 10 is a block diagram showing an exemplary configuration of the data gather unit in FIG. 4.

Referring to FIG. 10, data gather unit (DGU) 44 includes a plurality of activators (ACT) 70 individually corresponding to processing elements (PE) 43 and data gather register (DGR) 71 as a second register.

Activator (ACT) 70 applies an activation function to a result of a multiply-and-accumulate computation output from corresponding processing element (PE) 43. Data gather register (DGR) 71 temporarily holds the result of the computation until the multiply-and-accumulate computation in all processing element groups (GPE) 42 and application of the activation function to the result of the multiply-and-accumulate computation are completed. At a time point of completion of all computations, data gather unit (DGU) 44 simultaneously writes the result of computation into output data buffer (NBout) 45.

[Method of Creating Index String and Weight Coefficient String]

A method of creating an index string and a weight coefficient string that are data stored in index string memory 60 and weight coefficient string memory 61, respectively, described with reference to FIG. 8 will now be described. A specific example in which output neurons $y_0$, $y_1$, and $y_2$ in FIG. 3 are allocated to three respective processing elements ($PE_{n,0}$, $PE_{n,1}$, and $PE_{n,2}$) included in common processing element group ($GPE_n$) 42 will be described.

Figure 12:
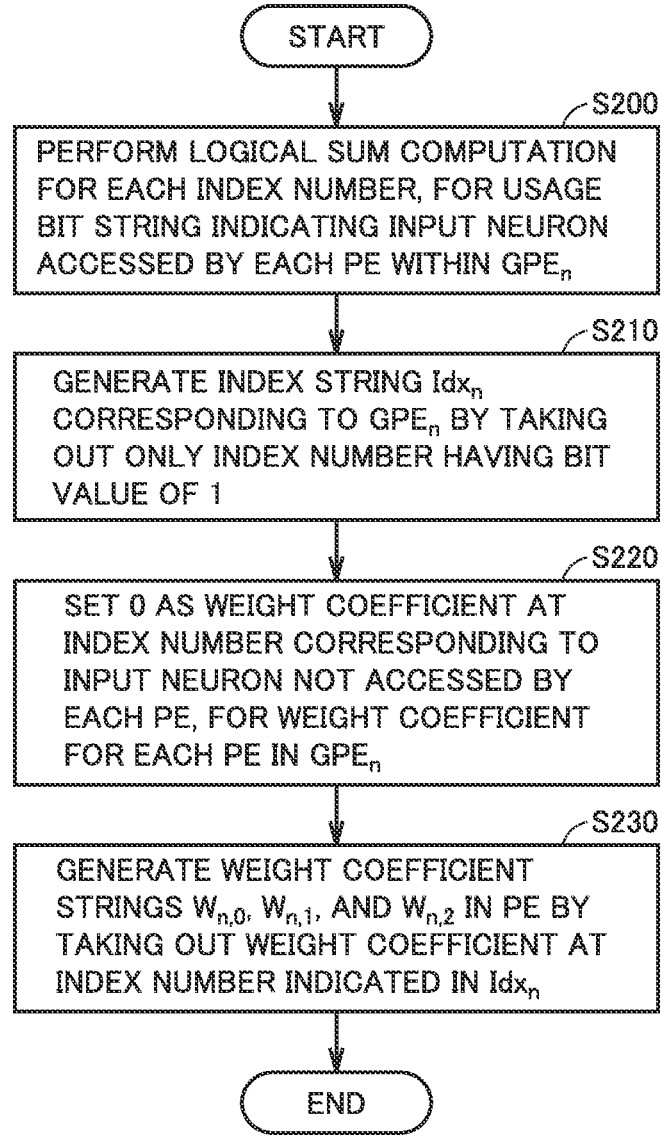
FIG. 12 is a flowchart showing a procedure of creating data to be stored in an index string memory and a weight coefficient string memory in FIG. 11.

FIG. 11 is a diagram for illustrating an exemplary method of creating storage data of an index string and a weight coefficient string. FIG. 12 is a flowchart showing a procedure of creating data to be stored in the index string memory and the weight coefficient string memory in FIG. 11. Each step in FIG. 12 can be performed by a computer.

Referring to FIG. 11 (A), initially, it is assumed that usage bit strings $idx_{n,0}$, $idx_{n,1}$, and $idx_{n,2}$ that represent input neurons (that is, index numbers) used for a multiply-and-accumulate computation are given for output neurons $y_0$, $y_1$, and $y_2$, respectively. The "usage bit string" refers to values aligned in an order of index numbers of input neurons $x_0$, $x_1$, ..., and $x_{15}$, with a value corresponding to an input neuron necessary for the multiply-and-accumulate computation being defined as "1" and a value corresponding to an input neuron unnecessary for the multiply-and-accumulate computation being defined as "0".

Referring to FIG. 11 (B), the computer performs a logical sum computation for each index number of input neurons $x_0$, $x_1$, ..., and $x_{15}$, for usage bit strings $idx_{n,0}$, $idx_{n,1}$, and $idx_{n,2}$ (step S200 in FIG. 12).

Referring to FIG. 11 (C), the computer generates an index string $Idx_n$ to be stored in index string memory 60 in processing element group ($GPE_n$) 42 by taking out only index numbers having a bit value of 1 in a result $Uidx_{n,i}$ of the logical sum computation in step S200 (step S210).

Then, referring to FIG. 11 (D), it is assumed that weight coefficient strings corresponding to output neurons $y_0$, $y_1$, and $y_2$ are given. As shown in FIG. 11 (D), the computer sets a weight coefficient corresponding to an input neuron not used for the multiply-and-accumulate computation (that is, not accessed by corresponding processing element (PE) 43) to 0 (step S220). In FIG. 11 (D), a portion where a weight coefficient other than 0 is given is left blank.

Then, referring to FIG. 11 (E), the computer takes out the weight coefficients at the index numbers shown in index string $Idx_n$ shown in FIG. 11 (C). Weight coefficient strings $W_{n,0}$, $W_{n,1}$, and $W_{n,2}$ to be stored in weight coefficient string memories 61 in processing elements $PE_{n,0}$, $PE_{n,1}$, and $PE_{n,2}$ corresponding to output neurons $y_0$, $y_1$, and $y_2$, respectively, are thus generated (step S220). The weight coefficient not used for the multiply-and-accumulate computation is set to 0 and a portion where a weight coefficient other than 0 is given is left blank also in FIG. 11 (E).

[Effect of First Embodiment]

As set forth above, according to the arithmetic device for the neural network in the first embodiment, processing element group (GPE) 42 is constituted of a plurality of processing elements (PE) 43, with the plurality of processing elements (PE) 43 being defined as one unit. Processing element groups (GPE) 42 can access in parallel to data scatter register (DSR) 50 provided in data scatter unit (DSU) 41 that stores input data. Therefore, in data scatter unit (DSU) 41, an access port is provided individually for each processing element group (GPE) 42, rather than for each processing element (PE) 43. Consequently, increase in number of access ports when the number of processing elements (PE) 43 and the number of computation units provided in each processing element (PE) 43 increase can be suppressed. Therefore, increase in circuit area in proportion to the number of access ports can be suppressed and processing performance of the arithmetic device can be enhanced without lowering in operating frequency.

Second Embodiment

According to the hardware configuration in the first embodiment, as a ratio of sharing of input data among a plurality of output neurons allocated to identical processing element group (GPE) 42 is higher, the number of times of issuance of a request for access to data scatter unit (DSU) 41 is reduced and a processing time period can be reduced.

For example, as a bit length of index string $Idx_n$ shown in FIG. 11 (C) is shorter, the number of times of access to data scatter unit (DSU) 41 decreases. In order to reduce the bit length of index string $Idx_n$, positions where bit 1 appears in usage bit strings $idx_{n,0}$, $idx_{n,1}$, and $idx_{n,2}$ shown in FIG. 11 (A) should be as identical as possible. In other words, as the ratio of sharing of input data is higher, the number of times of access to data scatter unit (DSU) 41 can be reduced.

According to an arithmetic device in the second embodiment, output neurons within an identical layer can be allocated to processing element (PE) 43 at any position so that a processing speed can be higher in accordance with characteristics (that is, how an input neuron and an output neuron are connected) of an algorithm of a neural network. Specific description will be given below with reference to the drawings.

[Exemplary Configuration of Data Gather Unit]

Figure 13:
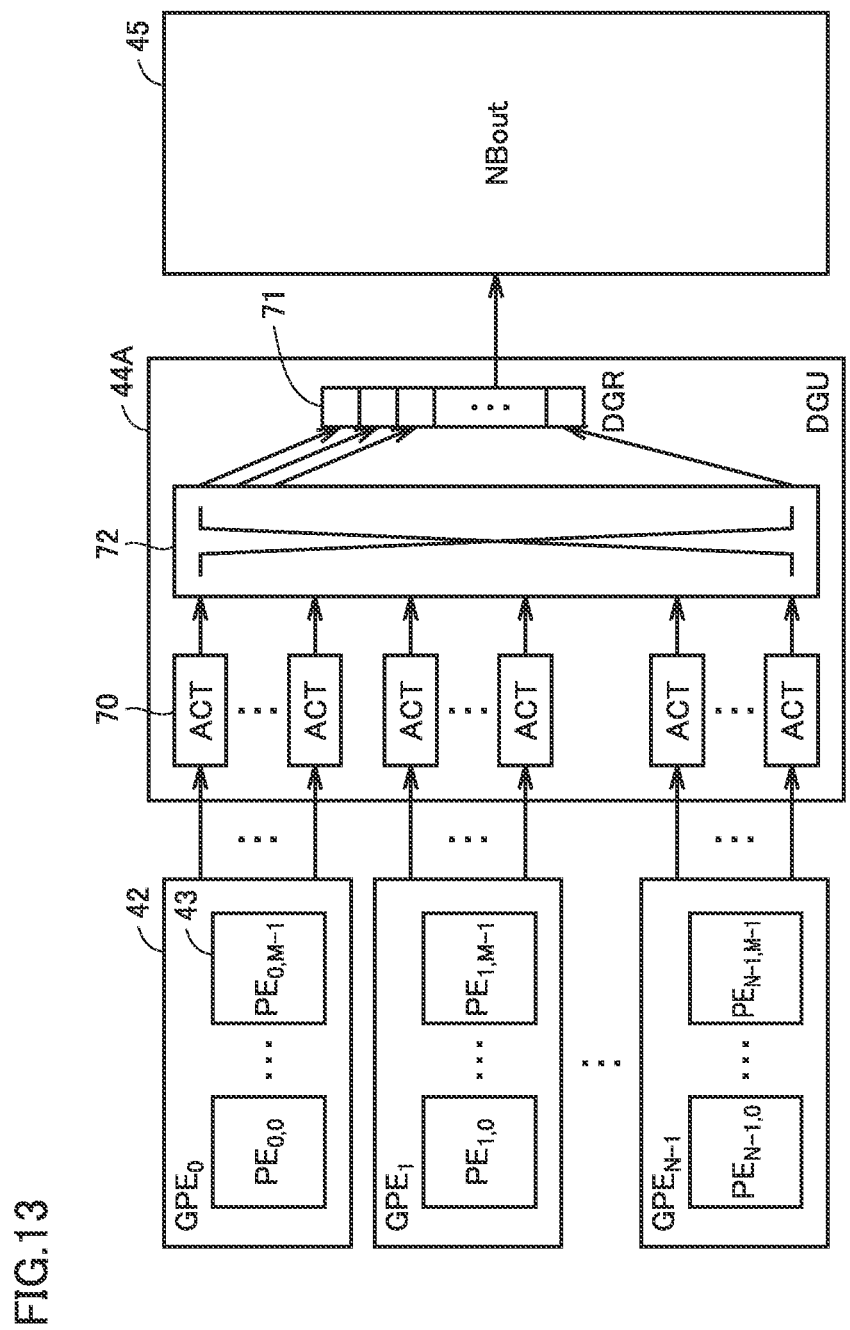
FIG. 13 is a block diagram showing an exemplary configuration of a data gather unit in an arithmetic device in a second embodiment.

FIG. 13 is a block diagram showing an exemplary configuration of a data gather unit in the arithmetic device in the second embodiment. A data gather unit (DGU) 44A in FIG. 13 is different from data gather unit (DGU) 44 in FIG. 10 in further including a switch 72.

As described previously, according to the arithmetic device in the second embodiment, output neurons are allocated to processing elements (PE) 43 in an order different from the order of index numbers of the output neurons. In other words, the output neurons are allocated to processing elements (PE) 43 in the order different from the order of computation assumed in an algorithm of a neural network. Switch 72 then rearranges results of computation output from a plurality of activators (ACT) 70 into the original order of the index. The rearranged results of computation are stored in data gather register (DGR) 71. A switch capable of switching connection into any order such as a crossbar switch is employed as switch 72.

Since FIG. 13 is otherwise the same as FIG. 10, the same or corresponding elements have the same reference numerals allotted and description will not be repeated.

Figure 14:
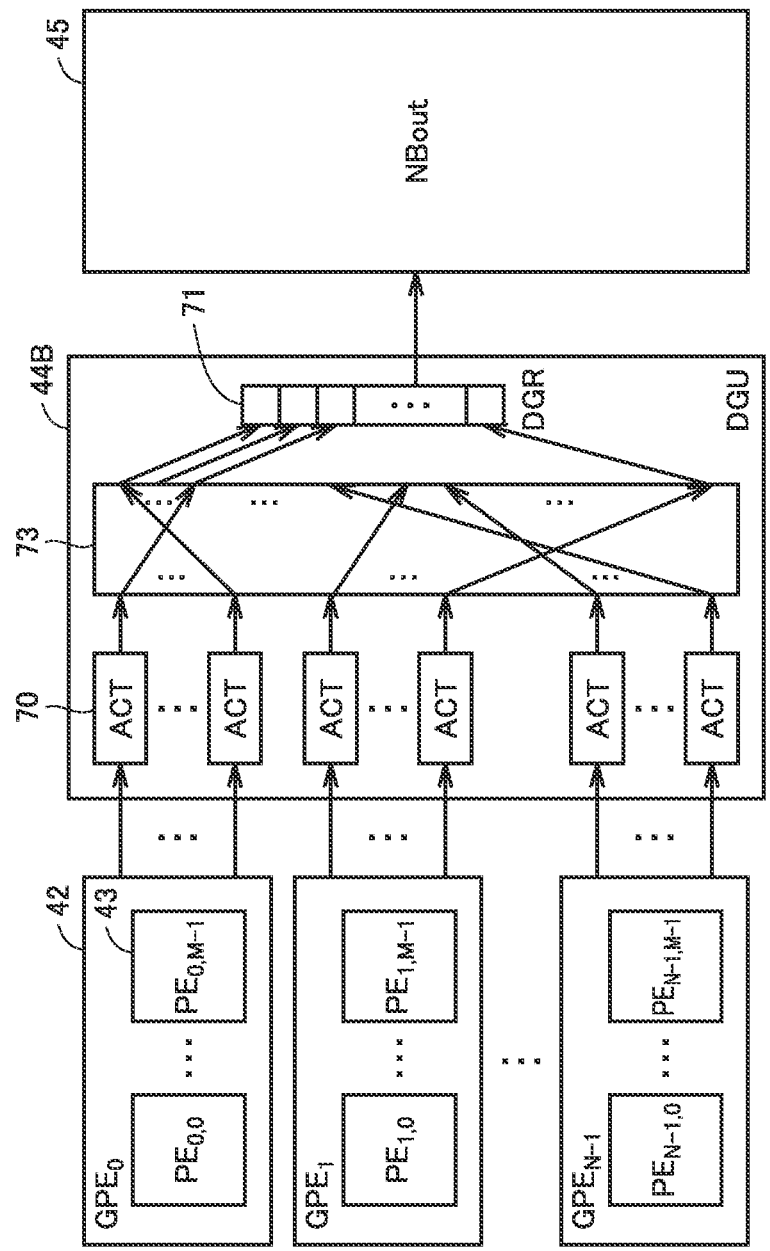
FIG. 14 is a block diagram showing a modification of the data gather unit in FIG. 13.

FIG. 14 is a block diagram showing a modification of the data gather unit in FIG. 13. A data gather unit (DGU) 44B in FIG. 14 is different from data gather unit (DGU) 44A in FIG. 13 in including a connector 73 that connects outputs of the plurality of activators (ACT) 70 to a plurality of storage areas in data gather register (DGR) 71 instead of switch 72.

Switch 72 provided in data gather unit (DGU) 44A in FIG. 13 can dynamically vary connection between outputs of the plurality of activators (ACT) 70 and the plurality of storage areas in data gather register (DGR) 71. In contrast, when an algorithm of a neural network does not have to be varied as in an arithmetic device of a trained neural network, allocation of output neurons to processing element (PE) 43 can be fixed at the time of design. In this case, as shown as connector 73 in FIG. 14, connection relation between the outputs of the plurality of activators (ACT) 70 and the plurality of storage areas in data gather register (DGR) 71 is set at the time of design and is not varied thereafter.

Since FIG. 14 is otherwise the same in configuration as FIG. 13, the same or corresponding elements have the same reference numerals allotted and description will not be repeated.

[Operations by Arithmetic Device]

Figure 15:
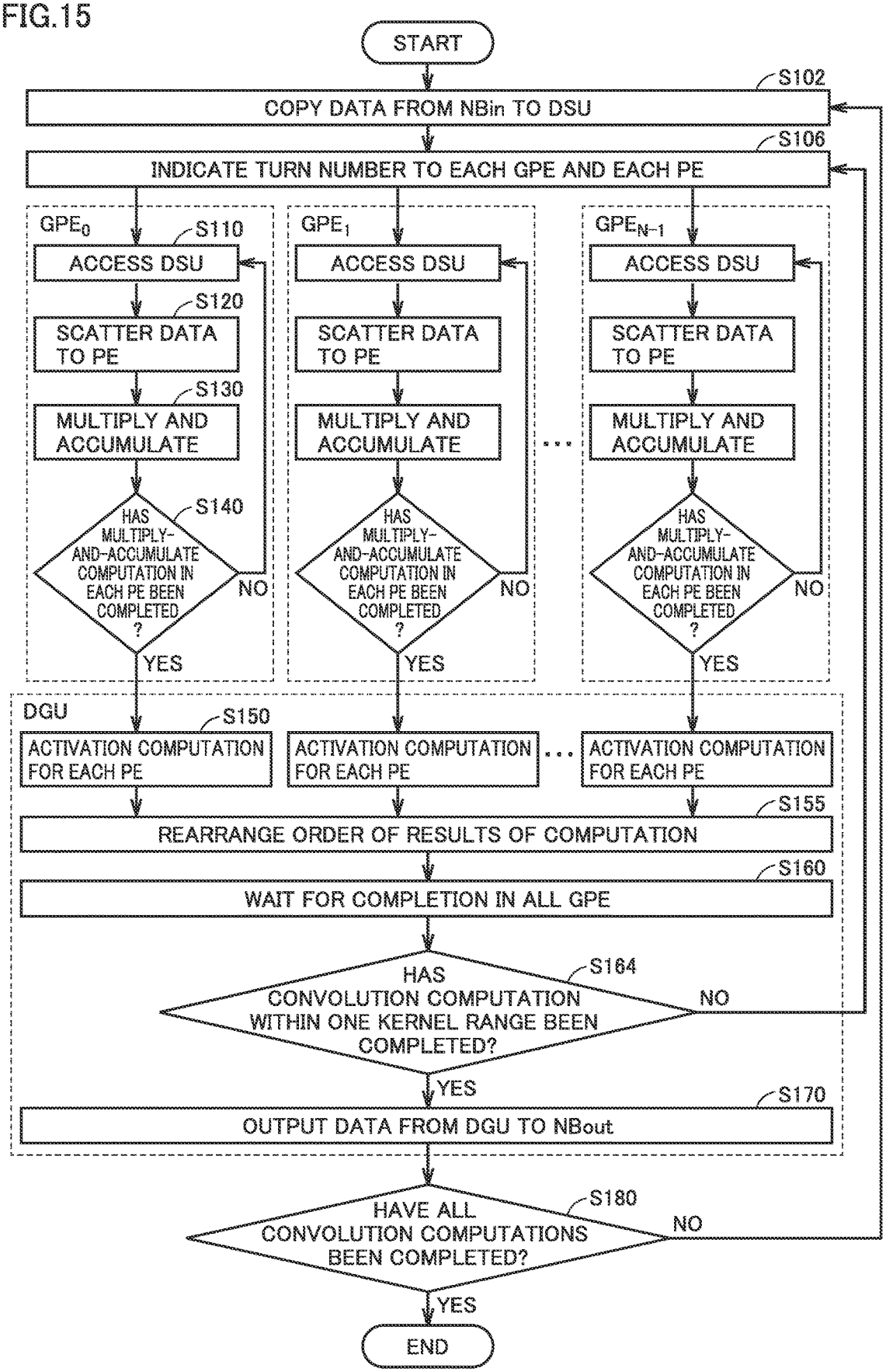
FIG. 15 is a flowchart showing a procedure of processing in the arithmetic device in the second embodiment.

FIG. 15 is a flowchart showing a procedure of processing in the arithmetic device in the second embodiment. The flowchart in FIG. 15 is different from the flowchart in FIG. 6 in including step S155 between steps S150 and S160.

In step S155, switch 72 in FIG. 15 rearranges the order of results of computation output from the plurality of activators (ACT) 70 into the original order of the algorithm, and has the results stored in data gather register (DGR) 71. Since FIG. 15 is otherwise the same as FIG. 6, the same or corresponding steps have the same reference numerals allotted and description will not be repeated.

[Specific Example of Data Processing]

An effect of the second embodiment will be described below with reference to specific examples.

Figure 16:
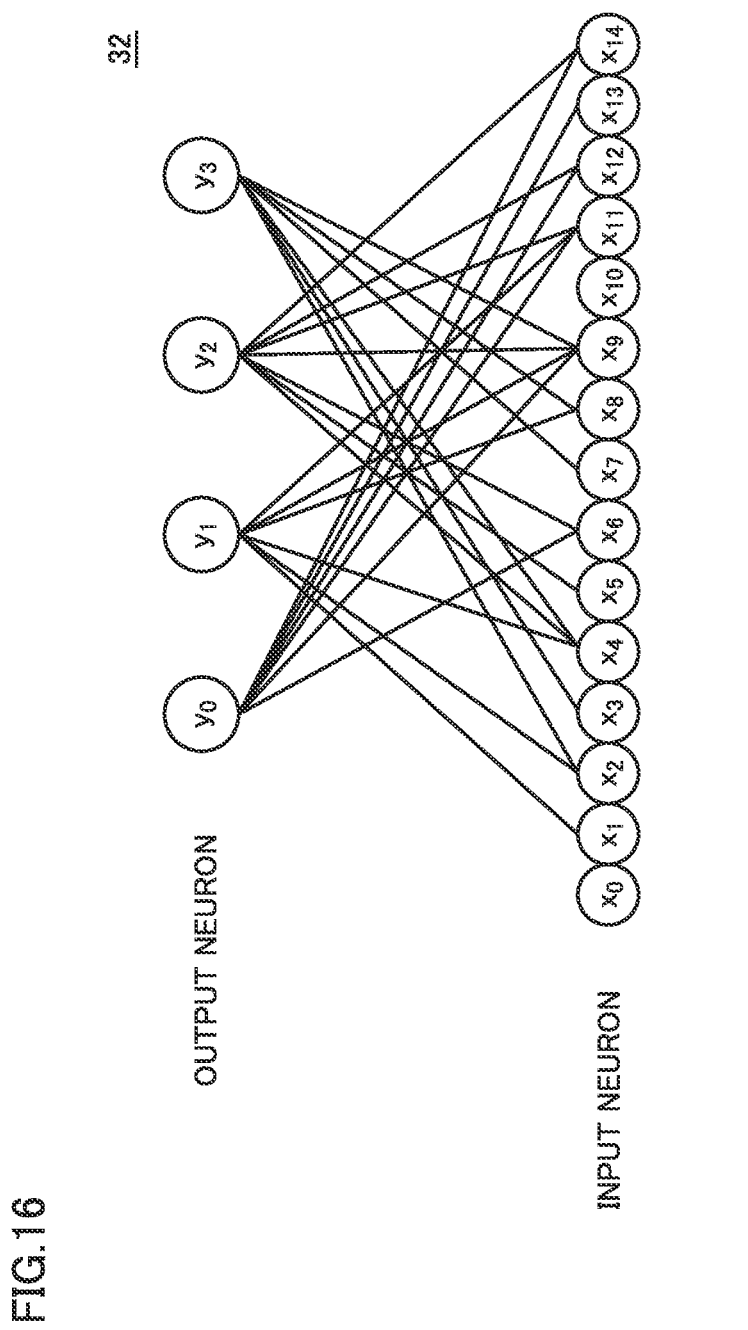
FIG. 16 is a conceptual diagram showing an exemplary algorithm of a convolutional layer.

FIG. 16 is a conceptual diagram showing an exemplary algorithm of a convolutional layer. Referring to FIG. 16, convolutional layer 32 includes fifteen input neurons $x_0$ to $x_{14}$ and four output neurons $y_0$ to $y_3$. Only at least one of input neurons $x_0$ to $x_{14}$ is connected to each output neuron.

Specifically, in the example in FIG. 16, in order to calculate values of output neurons $y_0$, $y_1$, $y_2$, and $y_3$, a multiply-and-accumulate computation is performed in accordance with expressions (3A) to (3D) below and an activation function is thereafter applied.

$$y_0 \leftarrow w_{0,6} \cdot x_6 + w_{0,9} \cdot x_9 + w_{0,11} \cdot x_{11} + w_{0,12} \cdot x_{12} + w_{0,13} \cdot x_{13} + w_{0,14} \cdot x_{14} \quad (3A)$$

$$y_1 \leftarrow w_{1,1} \cdot x_1 + w_{1,2} \cdot x_2 + w_{1,4} \cdot x_4 + w_{1,8} \cdot x_8 + w_{1,9} \cdot x_9 + w_{1,11} \cdot x_{11} \quad (3B)$$

$$y_2 \leftarrow w_{2,4} \cdot x_4 + w_{2,5} \cdot x_5 + w_{2,6} \cdot x_6 + w_{2,9} \cdot x_9 + w_{2,11} \cdot x_{11} + w_{2,12} \cdot x_{12} + w_{2,14} \cdot x_{14} \quad (3C)$$

$$y_3 \leftarrow w_{3,2} \cdot x_2 + w_{3,3} \cdot x_3 + w_{3,4} \cdot x_4 + w_{3,7} \cdot x_7 + w_{3,8} \cdot x_8 + w_{3,9} \cdot x_9 \quad (3D)$$

In the expressions (3A) to (3D), $w_{ij}$ ($0 \leq i \leq 3$, $0 \leq j \leq 15$) represents a weight coefficient. A bias value may be added to each of $y_0$, $y_1$, $y_2$, and $y_3$.

An example in which four output neurons shown in FIG. 16 are allocated to an arithmetic device with a hardware configuration including two processing element groups (GPE$_0$ and GPE$_1$) 42 each including two processing elements (PE$_{0,0}$ and PE$_{0,1}$ for GPE$_0$; PE$_{1,0}$ and PE$_{1,1}$ for GPE$_1$) will be described below.

Figure 17:
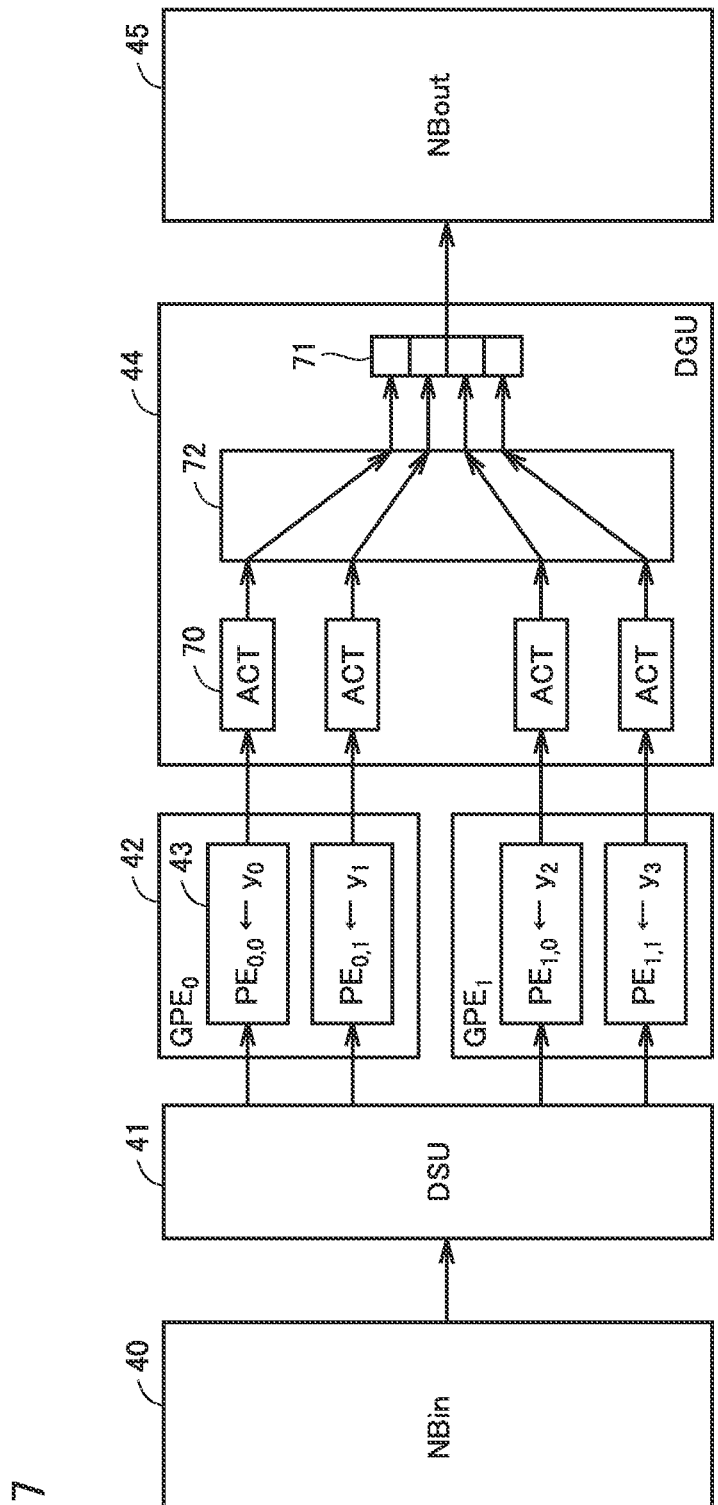
FIG. 17 is a diagram showing an example of allocation of a processing element for implementing a computation algorithm of the convolutional layer in FIG. 16.

FIG. 17 is a diagram showing an example of allocation of a processing element for implementing a computation algorithm of the convolutional layer in FIG. 16. In the example in FIG. 17, output neurons y$_0$, y$_1$, y$_2$, and y$_3$ are allocated to processing elements PE$_{0,0}$, PE$_{0,1}$, PE$_{1,0}$, and PE$_{1,1}$, respectively, without change in order (that is, in the order of the index number). Therefore, switch 72 provided in data gather unit (DGU) 44 outputs results of computation as they are, without changing the order of output.

Figure 18:
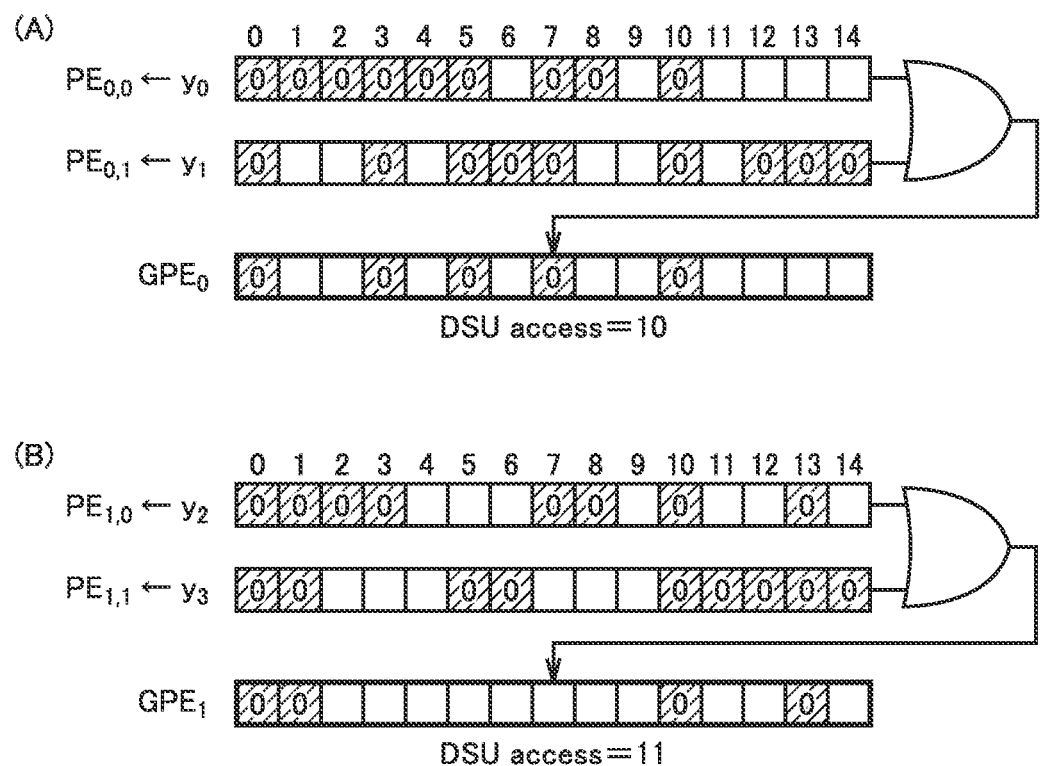
FIG. 18 is a diagram for illustrating the number of times of access to a data scatter unit in allocation in the arithmetic device in FIG. 17.

FIG. 18 is a diagram for illustrating the number of times of access to the data scatter unit in allocation in the arithmetic device in FIG. 17.

FIG. 18 (A) shows a usage bit string representing input neurons accessed by processing element PE$_{0,0}$ and a usage bit string representing input neurons accessed by processing element PE$_{0,1}$. FIG. 18 (A) further shows a result of a logical sum computation for each bit in the usage bit string, that is, a usage bit string representing input neurons accessed by the entire processing element group GPE$_0$. A portion in FIG. 18 (A) where a bit value is shown as 0 represents an input neuron that does not have to be accessed. Therefore, the number of times of access (which is referred to as "DSU access" in FIG. 18) to data scatter unit (DSU) 41 in the entire processing element group GPE$_0$ is ten.

FIG. 18 (B) shows a usage bit string representing input neurons accessed by processing element PE$_{1,0}$ and a usage bit string representing input neurons accessed by processing element PE$_{1,1}$. FIG. 18 (B) further shows a result of a logical sum computation for each bit in the usage bit string, that is, a usage bit string representing input neurons accessed by the entire processing element group GPE$_1$. A portion in FIG. 18 (B) where a bit value is shown as 0 represents an input neuron that does not have to be accessed. Therefore, the number of times of access to data scatter unit (DSU) 41 in the entire processing element group GPE$_1$ is eleven.

As set forth above, in allocation of processing elements in FIG. 17, the number of times of access to data scatter unit (DSU) 41 in both of processing element groups GPE$_0$ and GPE$_1$ is eleven.

Figure 19:
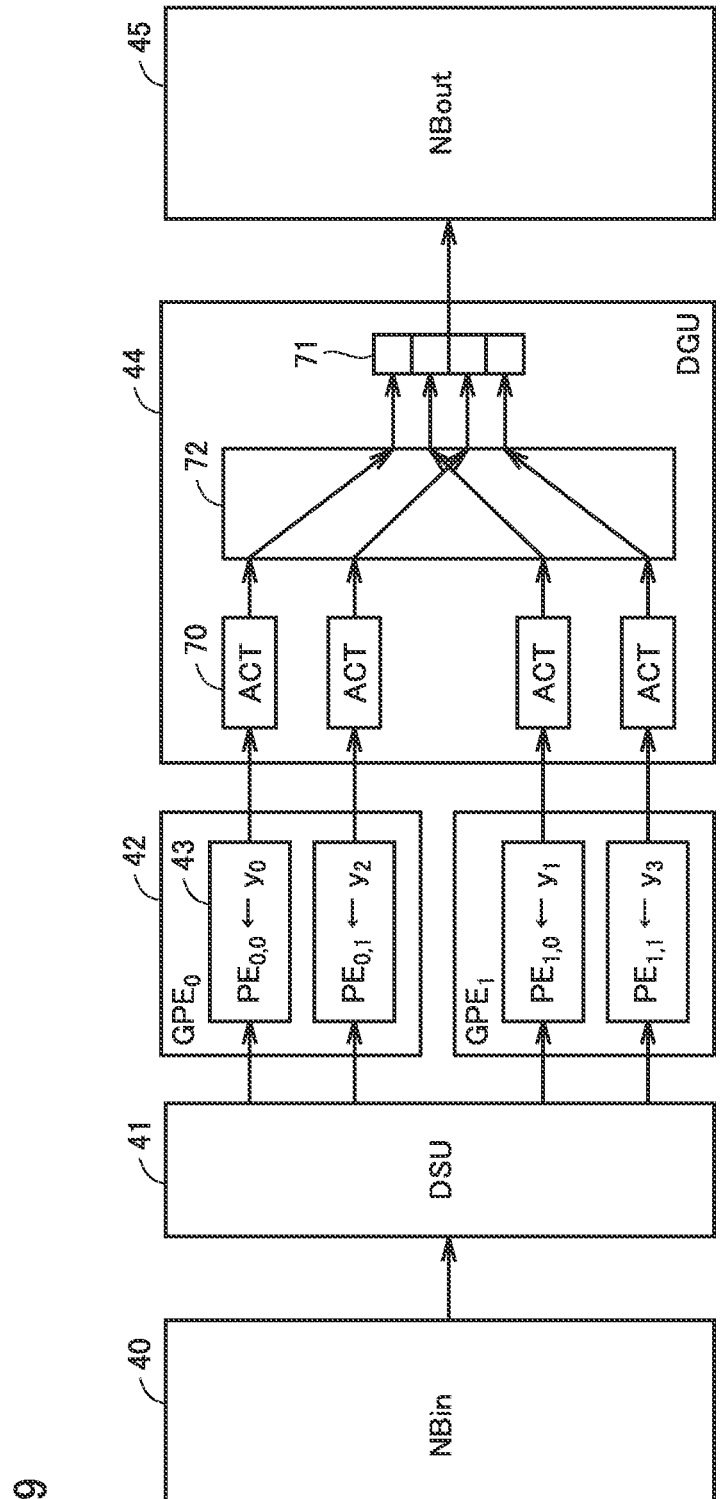
FIG. 19 is a diagram showing another example of allocation of a processing element for implementing a computation algorithm of the convolutional layer in FIG. 16.

FIG. 19 is a diagram showing another example of allocation of a processing element for implementing a computation algorithm of the convolutional layer in FIG. 16. In the example in FIG. 19, output neurons y$_0$, y$_1$, y$_2$, and y$_3$ with their order being changed to y$_0$, y$_2$, y$_1$, and y$_3$ are allocated to processing elements PE$_{0,0}$, PE$_{0,1}$, PE$_{1,0}$, and PE$_{1,1}$, respectively. Therefore, switch 72 of data gather unit (DGU) 44 should perform an operation to set the order of outputs of computation results back to the original order.

Figure 20:
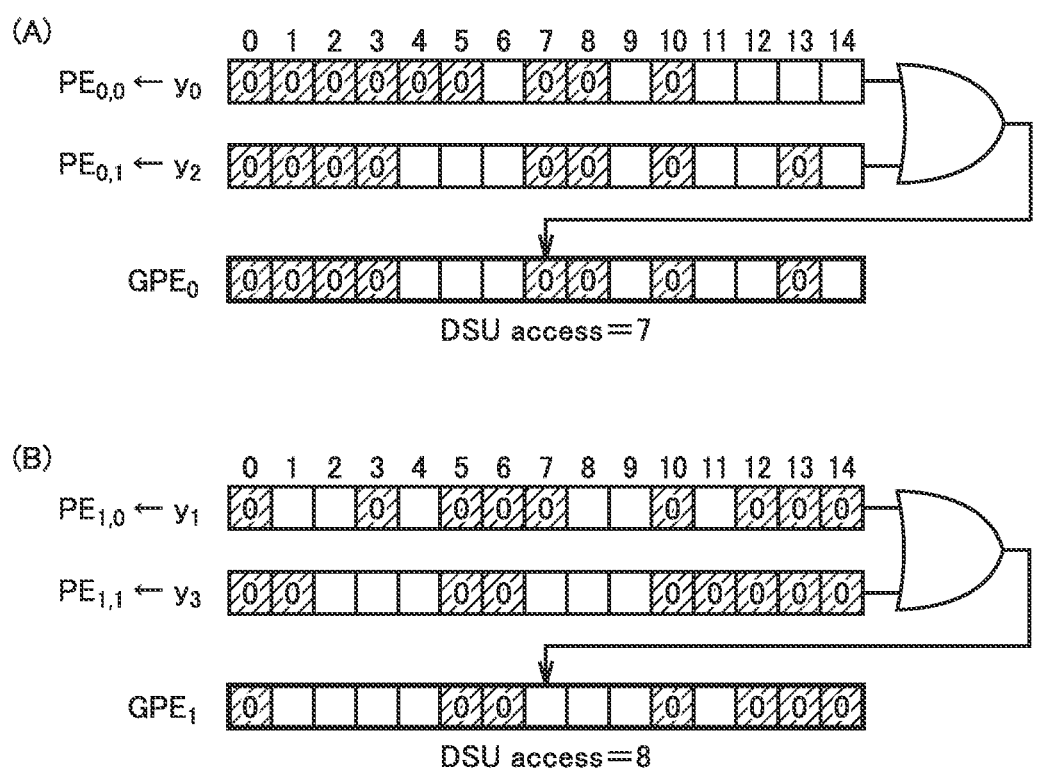
FIG. 20 is a diagram for illustrating the number of times of access to the data scatter unit in allocation in the arithmetic device in FIG. 19.

FIG. 20 is a diagram for illustrating the number of times of access to the data scatter unit in allocation in the arithmetic device in FIG. 19.

FIG. 20 (A) shows a usage bit string representing input neurons accessed by processing element PE$_{0,0}$ and a usage bit string representing input neurons accessed by processing element PE$_{0,1}$. FIG. 20 (A) further shows a result of a logical sum computation for each bit in the usage bit string, that is, a usage bit string representing input neurons accessed by the entire processing element group GPE$_0$. A portion in FIG. 20 (A) where a bit value is shown as 0 represents an input neuron that does not have to be accessed. Therefore, the number of times of access to data scatter unit (DSU) 41 in the entire processing element group GPE$_0$ is seven.

FIG. 20 (B) shows a usage bit string representing input neurons accessed by processing element PE$_{1,0}$ and a usage bit string representing input neurons accessed by processing element PE$_{1,1}$. FIG. 20 (B) further shows a result of a logical sum computation for each bit in the usage bit string, that is, a usage bit string representing input neurons accessed by the entire processing element group GPE$_1$. A portion in FIG. 20 (B) where a bit value is shown as 0 represents an input neuron that does not have to be accessed. Therefore, the number of times of access to data scatter unit (DSU) 41 in the entire processing element group GPE$_1$ is eight.

As set forth above, in allocation of processing elements in FIG. 19, the number of times of access to data scatter unit (DSU) 41 in both of processing element groups GPE$_0$ and GPE$_1$ is eight. It can therefore be seen that the number of times of access to data scatter unit (DSU) 41 is suppressed and a processing speed is higher as compared with allocation of the processing elements shown in FIG. 17.

[Effect of Second Embodiment]

As set forth above, according to the arithmetic device in the second embodiment, output neurons are allocated to an appropriate processing element (PE) 43 regardless of the order of index numbers of the output neurons defined in the algorithm of the neural network. Thus, output neurons high in ratio of sharing of input data can be allocated to a plurality of processing elements (PE) 43 belonging to identical processing element group (GPE) 42, so that the number of times of access to data scatter unit (DSU) 41 from processing element group (GPE) 42 can be reduced. Consequently, processing performance of the arithmetic device can be enhanced.

Third Embodiment

According to the arithmetic device in the second embodiment, output neurons 93 within an identical layer can be allocated to any processing element (PE) 43, so that the ratio of sharing of input data accessed by each processing element (PE) 43 can be higher and thus the processing time period can be reduced. In the arithmetic device in the second embodiment, however, only values of input neurons within a range of convolution kernel 90 at a certain slide position are taken into data scatter unit (DSU) 41 as input data, and output neurons corresponding to these input neurons are allocated to a plurality of processing elements (PE) 43. Since the range of input neurons is thus restricted, there is an upper limit of the ratio of sharing of input data.

According to an arithmetic device in a third embodiment, in a convolution computation with convolution kernel 90 being slid with respect to input neurons 91, values of input neurons corresponding to a plurality of convolution kernels 90 different in slide position are simultaneously stored in data scatter unit (DSU) 41 as input data. Then, output neurons corresponding to these input neurons are allocated to a plurality of processing elements (PE) 43. The ratio of sharing of the input data can thus be higher and the processing time period can be shorter than in the second embodiment. Specific description will be given below with reference to the drawings.

[Configuration of Arithmetic Device in Third Embodiment]

Figure 21:
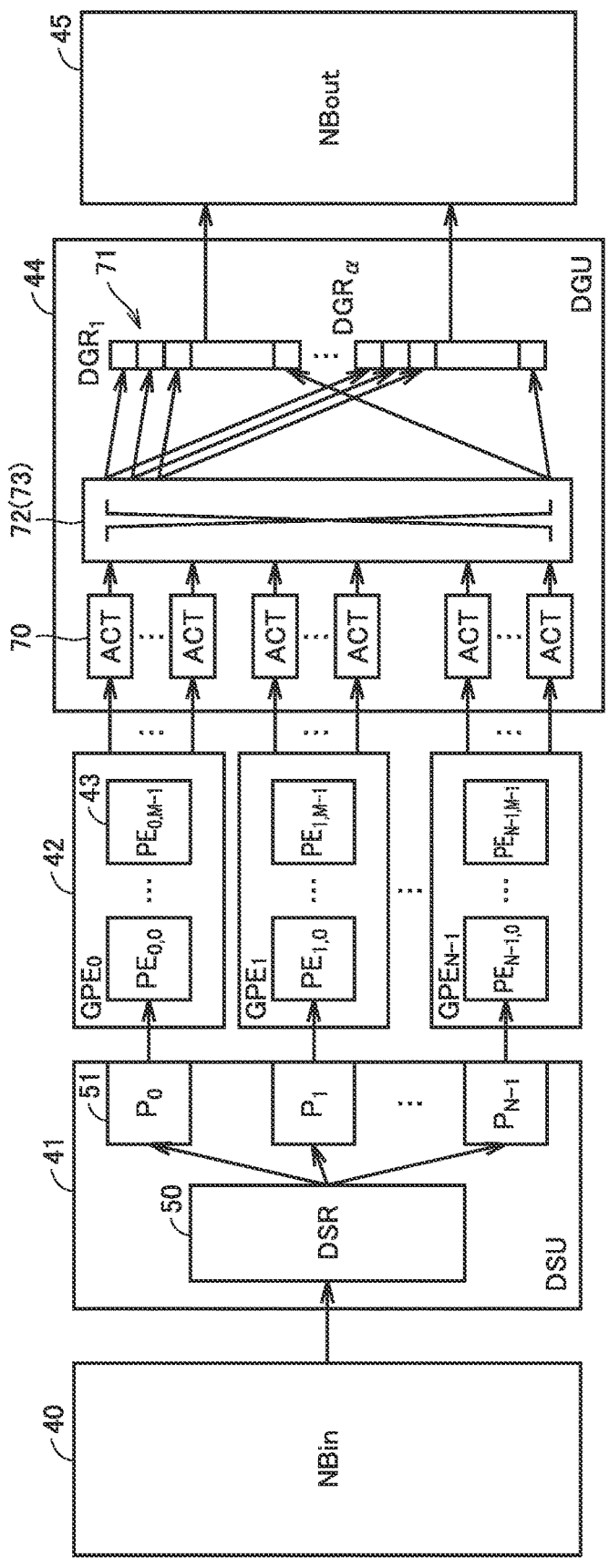
FIG. 21 is a block diagram showing an exemplary configuration of an arithmetic device in a third embodiment.

FIG. 21 is a block diagram showing an exemplary configuration of the arithmetic device in the third embodiment. The arithmetic device in the third embodiment shown in FIG. 21 is different from that in the first and second embodiments described with reference to FIG. 7 in function of data scatter unit (DSU) 41 and different from that in the second embodiment described with reference to FIGS. 13 and 14 in configuration and function of data gather unit (DGU) 44. Since FIG. 21 is otherwise the same as the first and second embodiments, the same or corresponding elements have the same reference numerals allotted and description will not be repeated.

Referring to FIG. 21, data scatter unit (DSU) 41 includes data scatter register (DSR) 50 as the first register and N ports (P0, P1, . . . , PN−1) corresponding to N respective processing element groups (GPE) 42.

In the third embodiment, data scatter unit (DSR) 50 in FIG. 21 can store values of input neurons within a range corresponding to α kernels from a first kernel to an αth kernel as input data necessary for a convolution computation. Data scatter register (DSR) 50 in the third embodiment is different in this regard from data scatter register (DSR) 50 in the arithmetic device in the first and second embodiments. Input data within a range corresponding to these α kernels can be transferred to corresponding processing element group (GPE) 42.

Furthermore, data gather unit (DGU) 44 in FIG. 21 includes a plurality of activators (ACT) 70 individually corresponding to processing elements (PE) 43, switch 72 or connector 73, and data gather register (DGR) 71 as the second register.

Switch 72 rearranges results of the computation output from the plurality of activators (ACT) 70 into the original order of indices and transfers the results to data gather register (DGR) 71 as in FIG. 13. Switch 72 can change, for example, correspondence with processing element (PE) 43 for each turn number.

As described with reference to FIG. 14, connector 73 which is a group of lines that connect the outputs of the plurality of activators (ACT) 70 to the plurality of storage areas in data gather register (DGR) 71 may be included instead of switch 72. Connection relation of the group of lines that makes up connector 73 is as designed and remains unchanged.

Data gather register (DGR) 71 is divided into a plurality of subregisters (DGR$_1$ to DGR$_\alpha$) corresponding to a respective kernels. Data gather register (DGR) 71 can thus simultaneously hold output data corresponding to α kernels from the first kernel to the αth kernel. Data gather register (DGR) 71 outputs the stored results of computation to output data buffer (NBout) 45 at the time point of completion of the convolution computation of input neurons within the range corresponding to the α kernels.

[Operations by Arithmetic Device]

Figure 22:
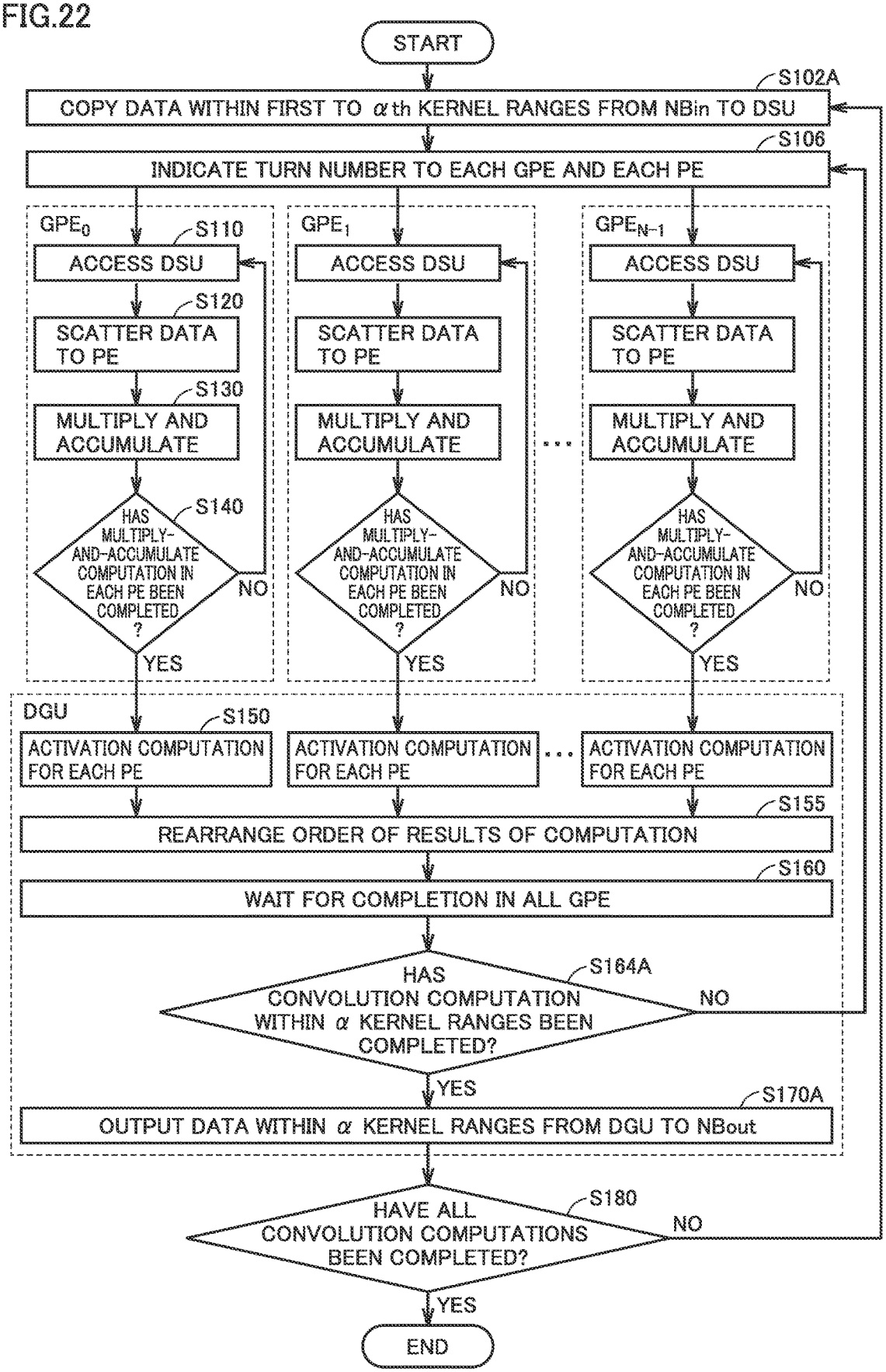
FIG. 22 is a flowchart showing a procedure of processing in the arithmetic device in the third embodiment.

FIG. 22 is a flowchart showing a procedure of processing in the arithmetic device in the third embodiment. The flowchart in FIG. 22 is different from the flowchart in FIG. 15 in that contents of processing in steps S102, S164, and S170 are changed to steps S102A, S164A, and S170A. Since FIG. 22 is otherwise the same in processing steps as FIG. 15, the same or corresponding steps have the same reference numerals allotted and description will not be repeated.

Specifically, in step S102A, data scatter unit (DSU) 41 takes in data necessary for the convolution computation within the α kernel ranges from the first kernel range to the αth kernel range from input data buffer (NBin) 40. Specifically, data necessary for the convolution computation for α kernels is copied from input data buffer (NBin) 40 to data scatter unit (DSU) 41.

The convolution computation thereafter is repeated until the convolution computation for α kernels is completed. In other words, the procedure from steps S106 to S160 is repeated until determination as YES is made in step S164A.

In step S170A, data gather unit (DGU) 44 outputs output data representing results of convolution computation within α kernel ranges from embedded data gather register (DGR) 71 to output data buffer (NBout) 45.

[Specific Example of Data Processing]

An effect of the third embodiment will be described below with reference to specific examples.

Figure 23:
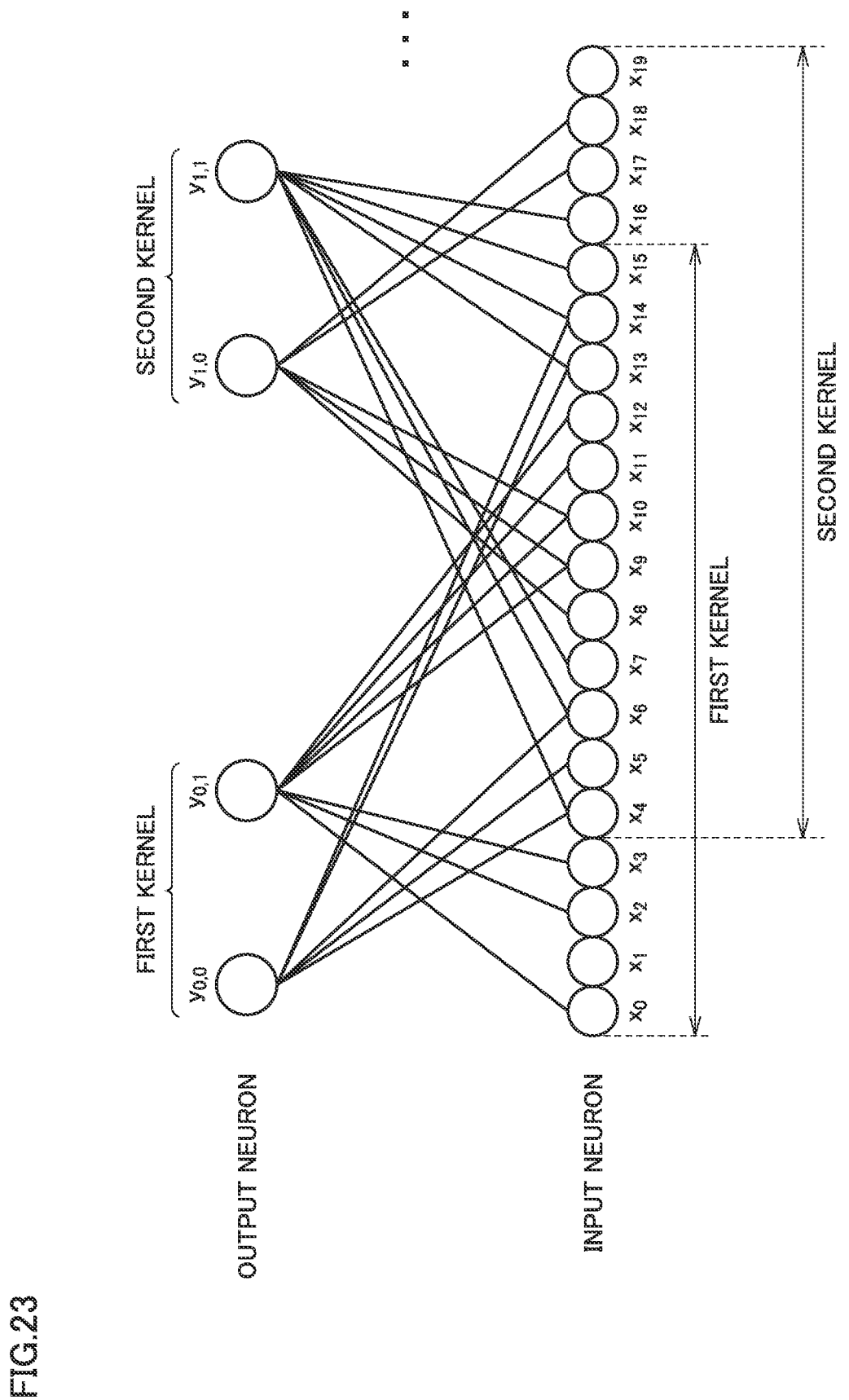
FIG. 23 is a conceptual diagram showing an exemplary algorithm of a convolutional layer 32.

FIG. 23 is a conceptual diagram showing an exemplary algorithm of convolutional layer 32. Referring to FIG. 23, convolutional layer 32 includes twenty input neurons $x_0$ to $x_{19}$ and four output neurons $y_{0,0}$ to $y_{1,1}$. Only at least one of input neurons 91 is connected to each output neuron.

As shown in FIG. 23, input neurons $x_0$ to $x_{15}$ correspond to a first kernel and results of the convolution computation of input neurons $x_0$ to $x_{15}$ within a range of the first kernel are output to output neurons $y_{0,0}$ and $y_{0,1}$. Input neurons $x_4$ to $x_{19}$ correspond to a second kernel and results of the convolution computation of input neurons $x_4$ to $x_{19}$ within a range of the second kernel are output to output neurons $y_{1,0}$ and $y_{1,1}$.

Specifically, in order to calculate values of output neurons $y_{0,0}$ to $y_{1,1}$, a multiply-and-accumulate computation is carried out in accordance with expressions (4A) to (4D) below and thereafter an activation function is applied.

$$y_{0,0} \leftarrow w_{0,4} \cdot x_4 + w_{0,5} \cdot x_5 + w_{0,6} \cdot x_6 + w_{0,13} \cdot x_{13} + w_{0,14} \cdot x_{14} \quad (4A)$$

$$y_{0,1} \leftarrow w_{1,0} \cdot x_0 + w_{1,2} \cdot x_2 + w_{1,3} \cdot x_3 + w_{1,9} \cdot x_9 + w_{1,10} \cdot x_{10} + w_{1,11} \cdot x_{11} + w_{1,12} \cdot x_{12} \quad (4B)$$

$$y_{1,0} \leftarrow w_{0,4} \cdot x_8 + w_{0,5} \cdot x_9 + w_{0,6} \cdot x_{10} + w_{0,13} \cdot x_{17} + w_{0,14} \cdot x_{18} \quad (4C)$$

$$y_{1,1} \leftarrow w_{1,0} \cdot x_4 + w_{1,2} \cdot x_6 + w_{1,3} \cdot x_7 + w_{1,9} \cdot x_{13} + w_{1,10} \cdot x_{14} + w_{1,11} \cdot x_{15} + w_{1,12} \cdot x_{16} \quad (4D)$$

In the expressions (4A) to (4D), $w_{ij}$ ($0 \leq i \leq 1$, $0 \leq j \leq 19$) represents a weight coefficient. A bias value may be added to each of $y_{0,0}$, $y_{0,1}$, $y_{1,0}$, and $y_{1,1}$.

An example in which four output neurons shown in FIG. 23 are allocated to an arithmetic device with a hardware configuration including one processing element group GPE$_0$ including two processing elements PE$_{0,0}$ and PE$_{0,1}$ will be described below. As shown below, depending on how output neurons are allocated, a ratio of sharing of input data accessed by each processing element (PE) 43 can be improved to achieve a faster processing speed.

Figure 24:
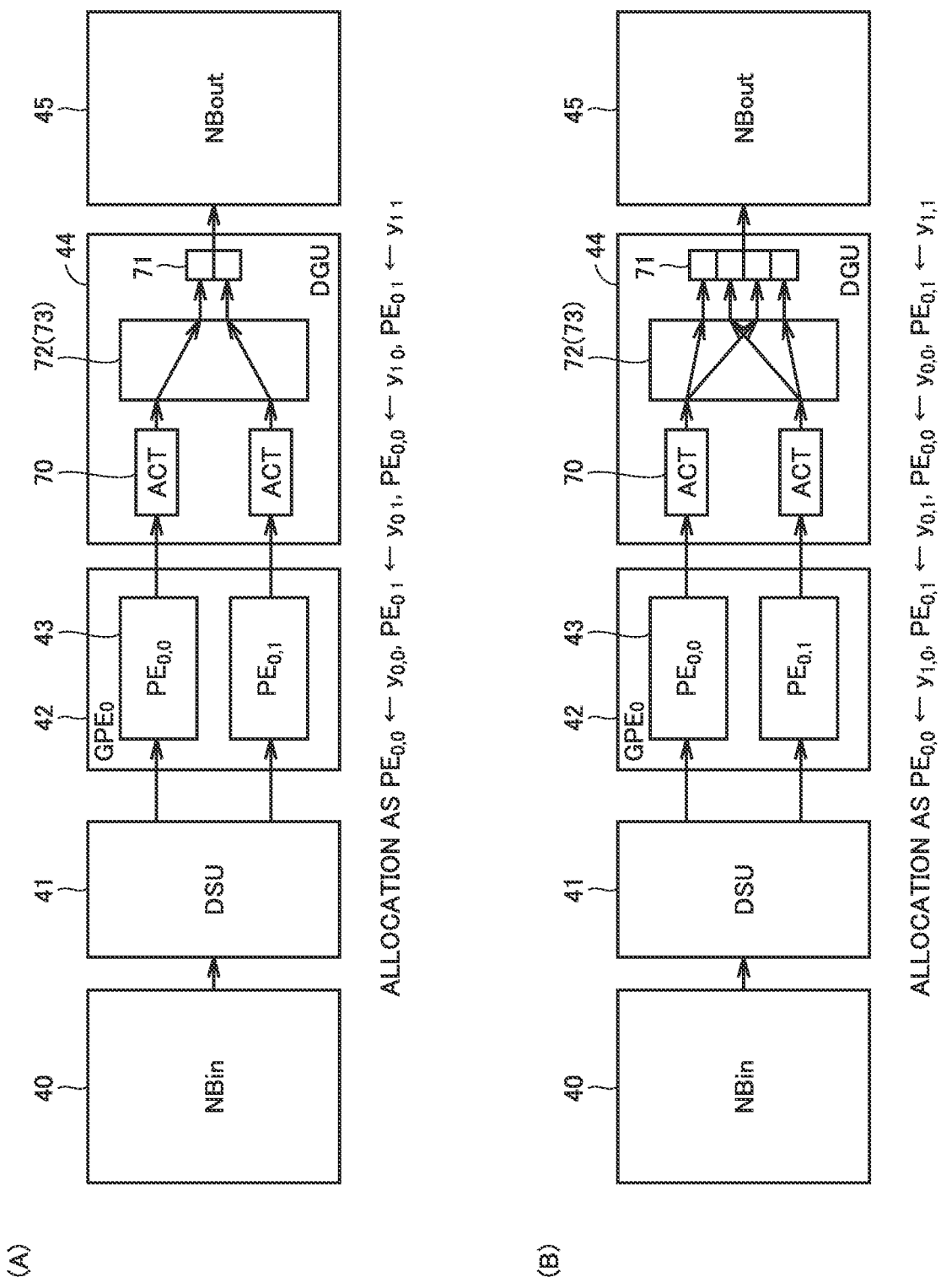
FIG. 24 is a diagram showing an example of allocation of hardware for implementing a computation algorithm of the convolutional layer in FIG. 23.

FIG. 24 is a diagram showing one example of allocation of hardware for implementing a computation algorithm of the convolutional layer in FIG. 23. FIG. 24 (A) shows an example in which the order of output from output neurons is not rearranged and FIG. 24 (B) shows an example in which the order of output from output neurons is rearranged.

In the example in FIG. 24 (A), output neuron $y_{0,0}$ is allocated to processing element PE$_{0,0}$ and output neuron $y_{0,1}$ is allocated to processing element PE$_{0,1}$. Furthermore, output neuron $y_{1,0}$ is allocated to processing element PE$_{0,0}$ and output neuron $y_{1,1}$ is allocated to processing element PE$_{0,1}$.

Initially, processing element group (GPE$_0$) 42 simultaneously calculates values of output neurons $y_{0,0}$ and $y_{0,1}$. Then, processing element group (GPE$_0$) 42 simultaneously calculates values of output neurons $y_{1,0}$ and $y_{1,1}$.

In this case, since the simultaneously calculated values of the output neurons correspond to common convolution kernel 90, they can be output as they are without change in order of output. Therefore, a storage area for two output neurons should only be allocated to data gather register (DGR) 71 in data gather unit (DGU) 44. Specifically, when data gather register (DGR) 71 receives values of output neurons $y_0, 0$ and $y_{0,1}$ corresponding to the first kernel, it outputs the values as they are to output data buffer (NBout) 45. Then, when data gather register (DGR) 71 receives values of output neurons $y_{1,0}$ and $y_{1,1}$ corresponding to the second kernel, it outputs the values as they are to output data buffer (NBout) 45.

In the example in FIG. 24 (B), output neuron $y_{1,0}$ is allocated to processing element $PE_{0,0}$ and output neuron $y_{0,1}$ is allocated to processing element $PE_{0,1}$. Furthermore, output neuron $y_{0,0}$ is allocated to processing element $PE_{0,0}$ and output neuron $y_{1,1}$ is allocated to processing element $PE_{0,1}$.

Initially, processing element group ($GPE_0$) 42 simultaneously calculates values of output neurons $y_{1,0}$ and $y_{0,1}$. Then, processing element group ($GPE_0$) 42 simultaneously calculates values of output neurons $y_{0,0}$ and $y_{1,1}$.

In this case, since the simultaneously calculated values of the output neurons correspond to different convolution kernels 90, switch 72 or connector 73 rearranges the order of output of the output data. Furthermore, a storage area for output neurons $y_{0,0}$ and $y_{0,1}$ corresponding to the first kernel and a storage area for output neurons $y_{1,0}$ and $y_{1,1}$ corresponding to the second kernel, that is, a storage area for four output neurons, are required in data gather register (DGR) 71 within data gather unit (DGU) 44. The output data is transferred from data gather register (DGR) 71 to output data buffer (NBout) 45 at the time point of completion of calculation of values of four output neurons.

FIG. 25 is a diagram for illustrating the number of times of access to the data scatter unit in allocation in the arithmetic device in FIG. 24 (A).

FIG. 25 shows a usage bit string representing input neurons 91 accessed by the processing element ($PE_{0,0}$) and a usage bit string representing input neurons 91 accessed by the processing element ($PE_{0,1}$). FIG. 25 (A) shows a usage bit string in computing output neurons $y_{0,0}$ and $y_{0,1}$ corresponding to the first kernel and FIG. 25 (B) shows a usage bit string in computing output neurons $y_{1,0}$ and $y_{1,1}$ corresponding to the second kernel. Attention should be paid to FIG. 25 (B) where the index number of the usage bit string is shifted by four as compared with FIG. 25 (A).

FIG. 25 further shows a result of a logical sum computation for each bit in the usage bit string, that is, the usage bit string representing input neurons 91 accessed by the entire processing element group ($GPE_0$). A portion where a bit value is shown as 0 in the result of the logical sum computation shown in FIG. 25 represents input neuron 91 that does not have to be accessed.

Therefore, as shown in FIG. 25 (A), the number of times of access to data scatter unit (DSU) 41 in the entire processing element group ($GPE_0$) in computing output neurons $y_{0,0}$ and $y_{0,1}$ is twelve. As shown in FIG. 25 (B), the number of times of access to data scatter unit (DSU) 41 in the entire processing element group ($GPE_0$) in computing output neurons $y_{1,0}$ and $y_{1,1}$ is twelve. Therefore, the total number of times of access is twenty four.

Figure 26:
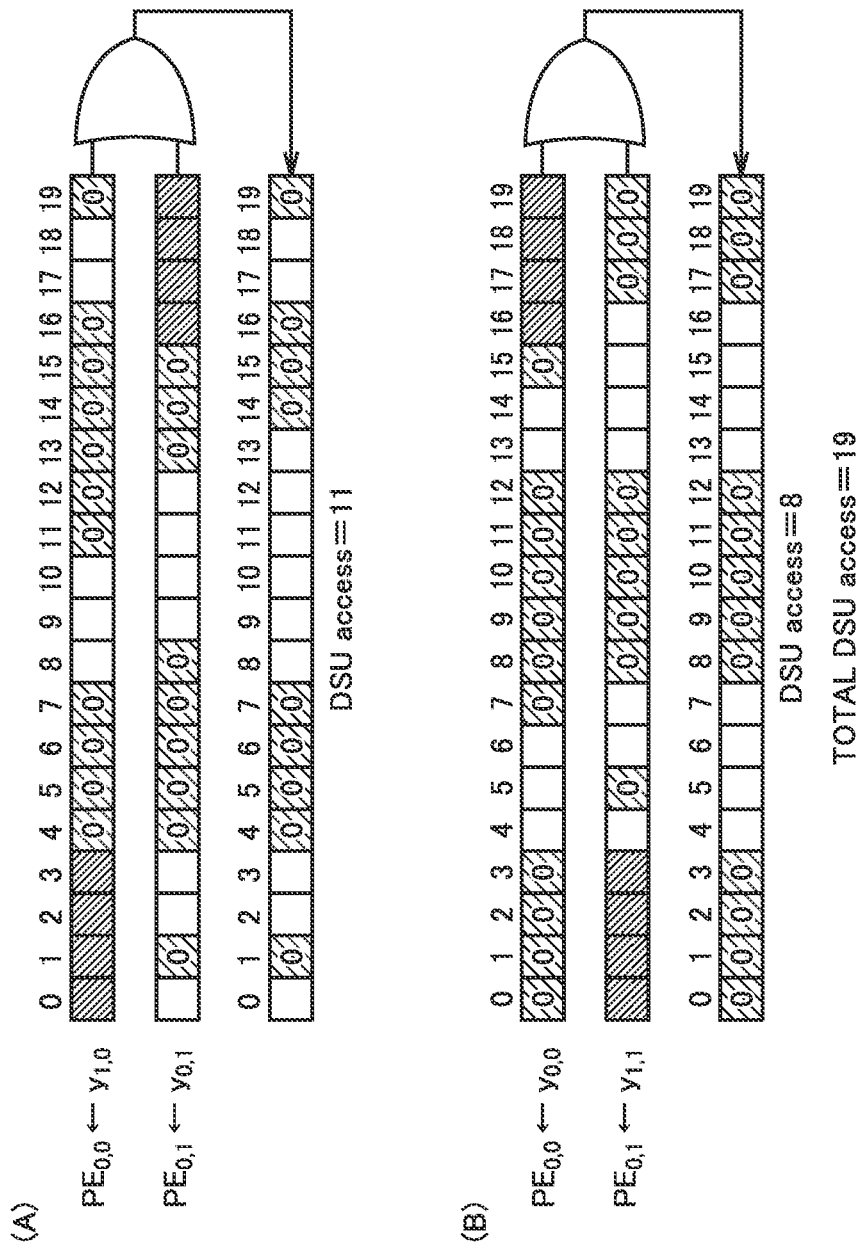
FIG. 26 is a diagram for illustrating the number of times of access to the data scatter unit in allocation in the arithmetic device in FIG. 24 (B).

FIG. 26 is a diagram for illustrating the number of times of access to the data scatter unit in allocation in the arithmetic device in FIG. 24 (B).

FIG. 26 shows a usage bit string representing input neurons 91 accessed by the processing element ($PE_{0,0}$) and a usage bit string representing input neurons 91 accessed by the processing element ($PE_{0,1}$). FIG. 26 (A) shows a usage bit string in computing output neurons $y_{1,0}$ and $y_{0,1}$ and FIG. 26 (B) shows a usage bit string in computing output neurons $y_{0,0}$ and $y_{1,1}$. A portion corresponding to an input neuron with an index number not used for a computation is finely hatched.

FIG. 26 further shows a result of a logical sum computation for each bit in the usage bit string, that is, the usage bit string representing input neurons 91 accessed by the entire processing element group ($GPE_0$). For a portion corresponding to an input neuron with an index number not used for a computation (a portion finely hatched in the figure), the logical sum computation is performed with a logical value being set to "0". A portion of the result of the logical sum computation shown in FIG. 26 where the bit value is shown as 0 represents input neuron 91 that does not have to be accessed.

Therefore, as shown in FIG. 26 (A), the number of times of access to data scatter unit (DSU) 41 in the entire processing element group ($GPE_0$) in computing output neurons $y_{1,0}$ and $y_{0,1}$ is eleven. As shown in FIG. 26 (B), the number of times of access to data scatter unit (DSU) 41 in the entire processing element group ($GPE_0$) in computing output neurons $y_{0,0}$ and $y_{1,1}$ is eight. Therefore, the total number of times of access is nineteen.

As set forth above, it has been shown that the number of times of access to data scatter unit (DSU) 41 can be reduced and the processing speed can be increased by adopting the hardware configuration in the third embodiment and by optimally allocating output neurons to processing elements (PE) 43 as described in the second embodiment.

[Effect of Third Embodiment]

As set forth above, according to the arithmetic device in the third embodiment, in performing a convolution computation with convolution kernel 90 being slid with respect to input neurons 91 in the algorithm of the neural network, a plurality of output neurons corresponding to a plurality of convolution kernels 90 different in position of sliding are simultaneously allocated to processing elements (PE). Since computations for convolution kernels high in ratio of sharing of input data can thus be allocated to a plurality of processing elements (PE) 43 belonging to the same processing element group (GPE) 42, the number of times of access from processing element group (GPE) 42 to data scatter unit (DSU) 41 can be reduced. Consequently, processing performance of the arithmetic device can be enhanced.

Fourth Embodiment

A fourth embodiment is different from the first to third embodiments in a method of passing data between layers of a neural network. Processing in a layer in a subsequent stage can thus be started before completion of processing in a layer in a preceding stage. Description will be given below with reference to the drawings.

Figure 27:
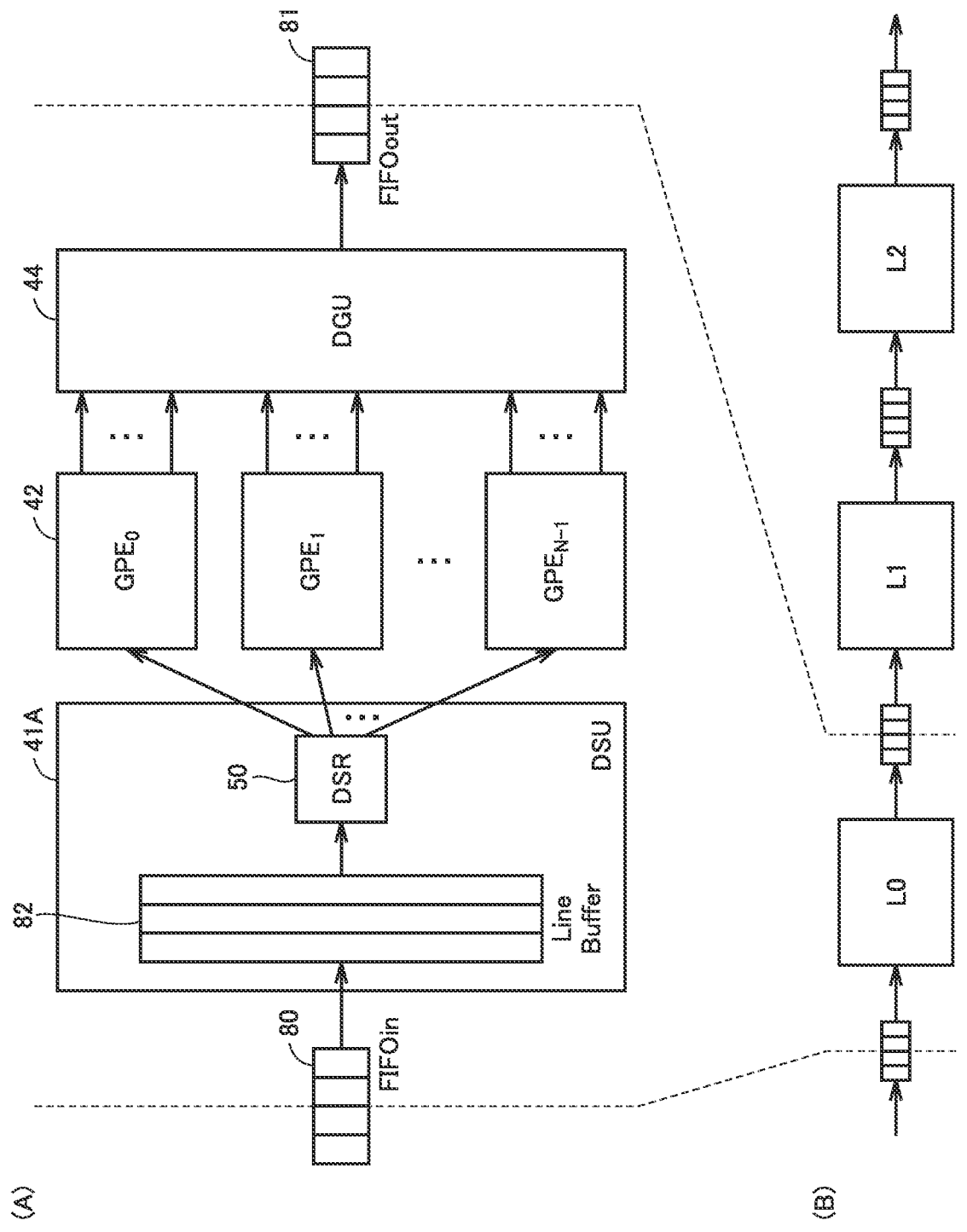
FIG. 27 is a diagram showing a configuration of an arithmetic device and connection between layers of a neural network in a fourth embodiment.

FIG. 27 is a diagram showing a configuration of an arithmetic device and connection between layers of a neural network in the fourth embodiment. FIG. 27 (A) shows an exemplary configuration of the arithmetic device and FIG. 27 (B) shows connection between layers of the neural network.

The neural network in FIG. 27 is different from that in the first and second embodiments in including a first-in, first-out (FIFO) queue (an input queue (FIFOin) 80 and an output queue (FIFOout) 81) instead of neuron buffer 31 (input data buffer (NBin) 40 and output data buffer (NBout) 45) for passing data at a boundary between layers L0, L1, L2, . . . .

Furthermore, a data scatter unit (DSU) 41A in the arithmetic device in FIG. 27 is different from data scatter unit (DSU) 41 shown in FIG. 7 in including a line buffer 82 that receives input data from input queue (FIFOin) 80. Line buffer 82 is connected between input queue (FIFOin) 80 and data scatter register (DSR) 50 and stores input data necessary for a computation in each processing element group (GPE) 42. Input data necessary for a multiply-and-accumulate computation at output neurons 94 within one kernel range of input data stored in line buffer 82 is transferred to data scatter register (DSR) 50 and further transferred to corresponding processing element group (GPE) 42. By interposing line buffer 82, data scatter unit (DSU) 41A can have data scatter register (DSR) 50 store data of one kernel in an order different from the order of input data provided from input queue (FIFOin) 80.

According to the configuration, each convolutional layer in the neural network can start computation processing at the time when input data of one kernel necessary for a computation in processing element group (GPE) 42 is ready even before completion of processing in the preceding stage. Since layers in the neural network are thus executed in parallel, processing can be faster.

Figure 28:
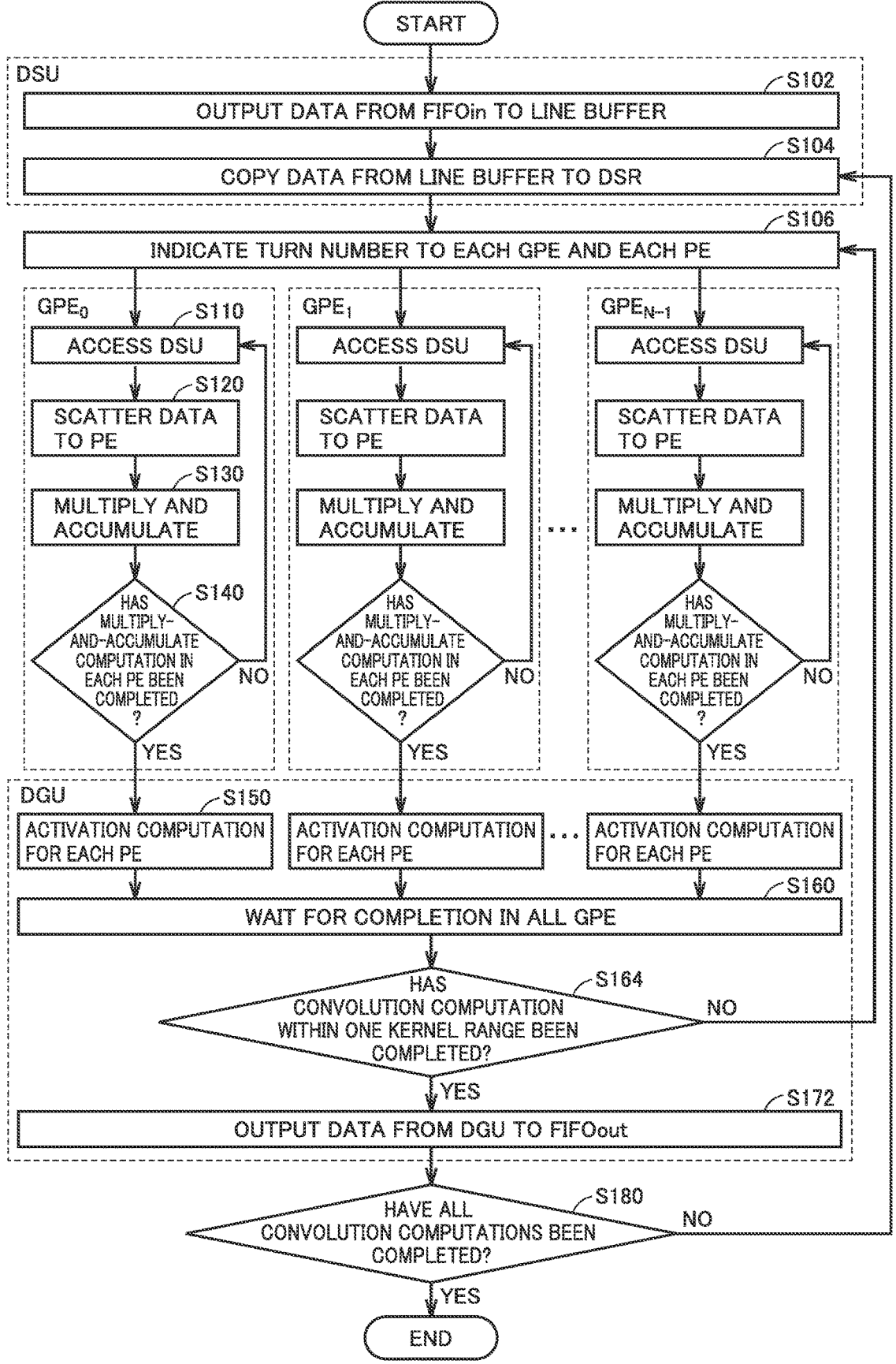
FIG. 28 is a flowchart showing a procedure of processing in the arithmetic device in the fourth embodiment.

FIG. 28 is a flowchart showing a procedure of processing in the arithmetic device in the fourth embodiment. The flowchart in FIG. 28 is different from the flowchart in FIG. 6 in that steps S102 and S104 are provided instead of step S102 and step S172 is provided instead of step S170.

Referring to FIGS. 27 and 28, initially, in step S102, data that has been subjected to computation processing is output from input queue (FIFOin) 80 to a corresponding line buffer. Then, in step S104, data scatter unit (DSU) 41 copies data from the line buffer to data scatter register (DSR) 50 at the time point when necessary input data is ready.

In next step S110, corresponding processing element group (GPE) 42 reads data from data scatter register (DSR) 50 by accessing data scatter register (DSR) 50. Since processing from next step S120 to step S164 (that is, the step of determining whether or not the convolution computation for one kernel range has been completed) is the same as in FIG. 6, description will not be repeated.

Data stored in data gather register (DGR) 71 is not output to output queue (FIFOout) 81 until a computation of output neurons within one kernel range is completed (that is, determination as YES is made in step S164). A procedure from step S104 to step S172 (that is, the step of outputting data from data gather unit (DGU) 44 to output queue (FIFOout) 81) is repeated until the convolution computation is completed for all kernels (determination as YES is made in step S180).

As set forth above, according to the arithmetic device of the neural network in the fourth embodiment, a queue is used for passing data between layers of the neural network and data input through the queue from a preceding stage is transferred to data scatter register (DSR) 50 through line buffer 82. By interposing line buffer 82, data scatter unit (DSU) 41A can have data scatter register (DSR) 50 store input data in one kernel in an order different from the order of input data given from the queue. Since processing in a layer in a subsequent stage can thus be started before completion of processing in a layer in a preceding stage, processing can be faster.

It should be understood that the embodiments disclosed herein are illustrative and non-restrictive in every respect. The scope of the present invention is defined by the terms of the claims rather than the description above and is intended to include any modifications within the scope and meaning equivalent to the terms of the claims.

REFERENCE SIGNS LIST 30 neural network; 31 neuron buffer; 32 convolutional layer; 33 pooling layer; 39 arithmetic device; 40 input data buffer (NBin); 41 data scatter unit (DSU); 42 processing element group (GPE); 43 processing element (PE); 44 data gather unit (DGU); 45 output data buffer (NBout); 50 data scatter register (DSR); 51 port; 60 index string memory; 61 weight coefficient string memory; 62 multiply-and-accumulate computation unit; 63, 64 pointer; 65 multiplier; 66 adder; 67 flip flop; 70 activator (ACT); 71 data gather register (DGR); 72 switch; 73 connector; 80 input queue (FIFOin); 81 output queue (FIFOout); 82 line buffer; $x_0$ to $x_{19}$ input neuron; $y_0$ to $y_3$, $y_{0,0}$ to $y_{1,1}$ output neuron

The invention claimed is:

1. An arithmetic device for a computation in a convolutional layer of a convolutional neural network, the convolutional layer including a plurality of input neurons and a plurality of output neurons each connected to at least one of the plurality of input neurons, the arithmetic device comprising:
a first register that stores input data as a value of at least one of the plurality of input neurons;
a plurality of ports; and
a plurality of processing element groups that correspond to the plurality of ports, respectively, and can access the first register through respective corresponding ports,
wherein the arithmetic device is configured to compare a number of output neurons within the range of one convolutional kernel to a total number of processing elements, and divide the number of output neurons into at least one turn when the number of output neurons is greater than the total number of processing elements,
wherein each of the processing element groups includes a plurality of processing elements, and each of the processing elements is associated with at least one of the plurality of output neurons within a range of one convolutional kernel and performs a multiply-and-accumulate computation for the at least one associated output neuron in which a value of at least one input neuron connected to the at least one associated output neuron is multiplied by a weight coefficient corresponding to a turn number of the at least one turn and a result of multiplication is accumulated, and
wherein each of the processing element groups is configured send a data access request to the first register to access one or more of the plurality of input neurons stored in the first register, the data request including an index string corresponding to the turn number of the at least one turn, and the index string including an index number of one or more of the plurality of input neurons.

2. The arithmetic device according to claim 1, wherein each of the plurality of processing element groups includes a first memory that stores plural index numbers of a plurality of input neurons necessary for performing the multiply-and-accumulate computation in the plurality of processing elements included in that processing element group.

3. The arithmetic device according to claim 2, wherein each of the plurality of processing element groups reads values of the input neurons based on the data access request which includes the plural index numbers stored in the first memory from the first register through a corresponding port and scatters the read values of the input neurons to the plurality of processing elements included in that processing element group.

4. The arithmetic device according to claim 2, wherein each of the plurality of processing elements included in each processing element group includes a second memory that stores a weight coefficient associated with each of the plural index numbers stored in a corresponding first memory.

5. The arithmetic device according to claim 1, further comprising:
   a plurality of activators that individually correspond to the processing elements, each of the plurality of activators applying an activation function to a result of the multiply-and-accumulate computation in a corresponding processing element; and
   a second register that stores outputs from the plurality of activators.

6. The arithmetic device according to claim 5, wherein
   the arithmetic device associates the plurality of output neurons with the processing elements in the plurality of processing element groups in a second order different from a first order, the first order being an order of index numbers of the plurality of output neurons,
   the arithmetic device further comprises a switch that rearranges outputs from the plurality of activators into the first order that is an original order of the index numbers of the plurality of output neurons, and
   the second register stores results output from the plurality of activators in the first order resulting from rearrangement by the switch.

7. The arithmetic device according to claim 6, wherein
   each processing element group is configured to read, from the first register, input data necessary for performing the multiply-and-accumulate computation in each processing element in the plurality of processing element groups fewer times when the plurality of output neurons are associated with the processing elements in the plurality of processing element groups in the second order than when the plurality of output neurons are associated with the processing elements in the plurality of processing element groups in the first order.

8. The arithmetic device according to claim 6, wherein
   a computation in the convolutional layer includes performing a convolution computation onto input neurons among the plurality of input neurons that are within a range corresponding to a convolution kernel, while the range is sequentially varied,
   the first register simultaneously stores as input data, a plurality of first input neurons and a plurality of second input neurons different from each other in the range,
   the second register simultaneously stores as output data, values of a plurality of first output neurons generated by the convolution computation onto the plurality of first input neurons and values of a plurality of second output neurons generated by the convolution computation onto the plurality of second input neurons, and
   the arithmetic device associates, in the second order, one of the plurality of first output neurons and one of the plurality of second output neurons with processing elements different from each other that belong to an identical processing element group.

9. The arithmetic device according to claim 1, wherein
   in the convolutional neural network, a plurality of layers each including the convolutional layer are connected in series, with a first-in first-out queue being interposed,
   the arithmetic device further comprises a line buffer connected between an input-side queue and the first register, and
   with the line buffer being interposed, the first register stores data necessary for a computation in the plurality of processing element groups in an order different from an order of input data provided from the input-side queue.

* * * * *